(12) United States Patent
Miyawaki et al.

(10) Patent No.: US 11,192,676 B2
(45) Date of Patent: Dec. 7, 2021

(54) COMPOSITE PREFORM, COMPOSITE CONTAINER, COMPOSITE PREFORM, PLASTIC MEMBER, AND METHOD FOR PRODUCING COMPOSITE CONTAINER

(71) Applicant: Dai Nippon Printing Co., Ltd., Tokyo (JP)

(72) Inventors: Takuma Miyawaki, Tokyo (JP); Yusuke Suga, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/529,213

(22) PCT Filed: Dec. 4, 2015

(86) PCT No.: PCT/JP2015/084194
§ 371 (c)(1),
(2) Date: May 24, 2017

(87) PCT Pub. No.: WO2016/093177
PCT Pub. Date: Jun. 16, 2016

(65) Prior Publication Data
US 2017/0355125 A1 Dec. 14, 2017

(30) Foreign Application Priority Data

Dec. 8, 2014 (JP) .............................. JP2014-248153
Dec. 17, 2014 (JP) .............................. JP2014-255419
(Continued)

(51) Int. Cl.
*B65D 1/02* (2006.01)
*B32B 1/02* (2006.01)
(Continued)

(52) U.S. Cl.
CPC ............ *B65D 1/0207* (2013.01); *B29B 11/14* (2013.01); *B29C 49/22* (2013.01); *B29C 49/221* (2013.01);
(Continued)

(58) Field of Classification Search
CPC ...... B65D 1/02; B65D 1/0215; B65D 1/0223; B65D 23/00; B65D 35/08; B65D 23/02;
(Continued)

(56) References Cited

U.S. PATENT DOCUMENTS 4,393,106 A 7/1983 Maruhashi et al.
5,405,667 A 4/1995 Heider
(Continued)

FOREIGN PATENT DOCUMENTS

CN 1507402 A 6/2004
CN 1635947 A 7/2005
(Continued)

OTHER PUBLICATIONS

International Search Report and Written Opinion (Application No. PCT/JP2015/084194) dated Feb. 9, 2016.
(Continued)

*Primary Examiner* — Walter Aughenbaugh
(74) *Attorney, Agent, or Firm* — Burr & Brown, PLLC

(57) ABSTRACT

A composite container is provided including a container body made of a plastic material and a plastic member disposed on the outer surface of the container body. The container body and the plastic member are integrally inflated by blow molding, and the plastic member includes a colored layer and/or a print layer where a print is made.

3 Claims, 28 Drawing Sheets

US 11,192,676 B2
Page 2

(30) Foreign Application Priority Data

| Dec. 18, 2014 | (JP) | JP2014-256524 |
| Dec. 19, 2014 | (JP) | JP2014-257737 |
| Dec. 24, 2014 | (JP) | JP2014-261339 |
| Dec. 25, 2014 | (JP) | JP2014-262682 |
| Dec. 25, 2014 | (JP) | JP2014-262738 |
| Dec. 25, 2014 | (JP) | JP2014-262799 |
| Dec. 25, 2014 | (JP) | JP2014-262913 |
| Dec. 26, 2014 | (JP) | JP2014-264979 |

(51) Int. Cl.

| B29B 11/14 | (2006.01) |
| B29C 49/22 | (2006.01) |
| B29C 49/24 | (2006.01) |
| B29C 49/02 | (2006.01) |
| B29C 49/06 | (2006.01) |
| B29C 49/48 | (2006.01) |
| B29K 101/12 | (2006.01) |
| B29L 31/00 | (2006.01) |

(52) U.S. Cl.

CPC ............ B29C 49/24 (2013.01); B32B 1/02 (2013.01); B65D 1/0215 (2013.01); B29B 2911/1408 (2013.01); B29B 2911/1414 (2013.01); B29B 2911/14093 (2013.01); B29B 2911/14266 (2013.01); B29B 2911/14273 (2013.01); B29B 2911/14313 (2013.01); B29B 2911/14573 (2013.01); B29C 49/06 (2013.01); B29C 2049/021 (2013.01); B29C 2049/024 (2013.01); B29C 2049/2422 (2013.01); B29C 2049/4892 (2013.01); B29C 2795/002 (2013.01); B29C 2795/005 (2013.01); B29K 2101/12 (2013.01); B29K 2995/0021 (2013.01); B29L 2031/7158 (2013.01); Y10T 428/1352 (2015.01); Y10T 428/1379 (2015.01)

(58) Field of Classification Search

CPC ... B65D 1/0207; B32B 1/02; B29C 2049/225; B29L 2031/7158; B29K 2995/0049; Y10T 428/1352; Y10T 428/1372; Y10T 428/1379

See application file for complete search history.

(56) References Cited

U.S. PATENT DOCUMENTS

| 6,270,868 | B1 | 8/2001 | Matsui |
| 6,984,354 | B2 | 1/2006 | Shelby et al. |
| 7,910,184 | B2 | 3/2011 | Uptergrove |
| 7,976,918 | B2 | 7/2011 | Uesugi et al. |
| 8,080,295 | B2* | 12/2011 | Kitzmiller ........... B29C 49/0073 220/62.22 |
| 8,192,812 | B2 | 6/2012 | Shi et al. |
| 8,800,794 | B2 | 8/2014 | Uesugi et al. |
| 9,114,895 | B2 | 8/2015 | Sato et al. |
| 9,650,169 | B2 | 5/2017 | Tom et al. |
| 9,919,817 | B2 | 3/2018 | Hayakawa et al. |
| 9,944,112 | B2 | 4/2018 | Furuhata et al. |
| 9,956,707 | B2 | 5/2018 | Chiba et al. |
| 2002/0166833 | A1* | 11/2002 | David Shelby ......... B29C 49/24 215/12.1 |
| 2005/0196563 | A1* | 9/2005 | Ito ....................... C08J 5/18 428/34.1 |
| 2006/0160933 | A1 | 7/2006 | Christensen |
| 2008/0047923 | A1 | 2/2008 | Zoppas et al. |
| 2014/0362136 | A1 | 12/2014 | Yatake |
| 2016/0046101 | A1 | 2/2016 | Ueda et al. |
| 2016/0136864 | A1* | 5/2016 | Miyawaki ............ B29C 49/04 206/457 |

FOREIGN PATENT DOCUMENTS

| CN | 1968855 A | 5/2007 |
| CN | 103732501 A | 4/2014 |
| DE | 2 135 406 A1 | 2/1973 |
| EP | 1 833 540 A1 | 9/2007 |
| EP | 2 521 641 A1 | 11/2012 |
| JP | 52-081377 A1 | 7/1977 |
| JP | S56-166027 A1 | 12/1981 |
| JP | S57-075855 A1 | 5/1982 |
| JP | S58-136318 A1 | 8/1983 |
| JP | 58-136317 U | 9/1983 |
| JP | 59-005035 A1 | 1/1984 |
| JP | 59-091038 | 5/1984 |
| JP | 61-206623 A | 9/1986 |
| JP | S63-178945 A | 7/1988 |
| JP | 64-030729 A1 | 2/1989 |
| JP | H02150331 A | 6/1990 |
| JP | 05-228988 A1 | 9/1993 |
| JP | H08-15754 A1 | 1/1996 |
| JP | 08-244781 A1 | 9/1996 |
| JP | 10-249922 A1 | 9/1998 |
| JP | 11-170361 A1 | 6/1999 |
| JP | 11-348184 A1 | 12/1999 |
| JP | 11-349713 A1 | 12/1999 |
| JP | 2000-102966 A1 | 4/2000 |
| JP | 2000-142684 A1 | 5/2000 |
| JP | 2002-047442 A | 2/2002 |
| JP | 2004-136486 A | 5/2004 |
| JP | 2004-532147 A | 10/2004 |
| JP | 2005-054080 A1 | 3/2005 |
| JP | 2005-343098 A1 | 12/2005 |
| JP | 2005-536616 A1 | 12/2005 |
| JP | 2006-111649 A1 | 4/2006 |
| JP | 2006-117269 A1 | 5/2006 |
| JP | 2006-240629 A1 | 9/2006 |
| JP | 2006-281630 A1 | 10/2006 |
| JP | 2006168354 A | 10/2006 |
| JP | 2008-120076 A | 5/2008 |
| JP | 2008-532816 A1 | 8/2008 |
| JP | 2008-201463 A | 9/2008 |
| JP | 2008-255134 A | 10/2008 |
| JP | 2008-290780 A1 | 12/2008 |
| JP | 2008-297494 A | 12/2008 |
| JP | 2008-308624 A1 | 12/2008 |
| JP | 2009-241526 A1 | 10/2009 |
| JP | 2010-173694 A | 8/2010 |
| JP | 2011-125861 A | 6/2011 |
| JP | 2012-012487 A1 | 1/2012 |
| JP | 2013-107212 A | 6/2013 |
| JP | 2014-094973 A | 5/2014 |
| JP | 2014-208738 A | 11/2014 |
| JP | 2004-352325 A | 12/2014 |
| JP | H07009540 A | 10/2020 |
| TW | 201236850 A | 9/2012 |
| WO | 2011/043969 A2 | 4/2011 |
| WO | 2011/082536 A1 | 7/2011 |
| WO | 2014/001099 A1 | 1/2014 |
| WO | 2014/021331 A1 | 2/2014 |
| WO | 2014/154130 A1 | 10/2014 |
| WO | 2014/161652 A1 | 10/2014 |

OTHER PUBLICATIONS

Japanese Office Action (Application No. 2014-202140) dated May 22, 2018 (with English translation).
Japanese Office Action (Application No. 2014-257737) dated Sep. 25, 2018.
Chinese Office Action (Application No. 201580066162.8) dated Dec. 24, 2018 (with English translation).
Japanese Notification of Reasons for Refusal (with English translation), Japanese Application No. 2014-256524, dated Dec. 14, 2018 (9 pages).
Japanese Decision of Refusal (with English translation), Japanese Application No. 2014-257737, dated Dec. 14, 2018 (7 pages).
Japanese Notification of Reasons for Refusal (with English translation), Japanese Application No. 2014-261339, dated Dec. 14, 2018 (8 pages).

(56) References Cited

OTHER PUBLICATIONS

Japanese Decision of Refusal (with English translation), Japanese Application No. 2014-262682, dated Dec. 14, 2018 (7 pages).
Japanese Notification of Reasons for Refusal (with English translation), Japanese Application No. 2014-262738, dated Dec. 14, 2018 (7 pages).
Japanese Notification of Reasons for Refusal (with English translation), Japanese Application No. 2014-262799, dated Dec. 14, 2018 (7 pages).
Japanese Notification of Reasons for Refusal (with English translation), Japanese Application No. 2014-262913, dated Dec. 14, 2018 (7 pages).
Japanese Notification of Reasons for Refusal (with English translation), Japanese Application No. 2014-264979, dated Dec. 14, 2018 (6 pages).
Japanese Office Action (Application No. 2014-248153) dated Sep. 11, 2018 (with English translation).
Japanese Office Action (Application No. 2014-255419) dated Sep. 11, 2018 (with English translation).
English translation of International Preliminary Report on Patentability (Chapter I) (Application No. PCT/JP2015/084194) dated Jun. 22, 2017, 9 pages.
Japanese Office Action (with English translation), Japanese Application No. 2014-261339 A, dated Oct. 5, 2018 (8 pages).
Extended European Search Report (Application No. 15867402.8) dated Aug. 24, 2018.
Taiwanese Office Action (Application No. 104141151) dated Nov. 12, 2018 (with English translation).
Taiwanese Office Action (Application No. 104141151) dated Jul. 16, 2018 (with English translation).
Japanese Office Action (Application No. 2014-262682) dated Sep. 4, 2018 (with English translation).
Japanese Office Action (Application No. 2014-262738) dated Sep. 4, 2018 (with English translation).
Japanese Office Action (Application No. 2014-262799) dated Sep. 4, 2018 (with English translation).
Japanese Office Action (Application No. 2014-262913) dated Sep. 4, 2018 (with English translation).
Japanese Office Action (Application No. 2014-262979) dated Sep. 4, 2018 (with English translation).
Japanese Office Action (with English translation), Japanese Application No. 2014-256524, dated Jul. 23, 2019 (6 pages).
Japanese Termination Notice (with English translation), Japanese Application No. 2014-257737, dated May 14, 2019 (7 pages).
Japanese Termination Notice (with English translation), Japanese Application No. 2014-262682, dated May 14, 2019 (7 pages).
Japanese Office Action (with English translation), Japanese Application No. 2014-262913, dated Apr. 12, 2019 (8 pages).
Japanese Decision of Dismissal of Amendment (Application No. 2014-261339) dated Apr. 19, 2019.
Japanese Decision of Refusal (Application No. 2014-261339) dated Apr. 19, 2019.
Japanese Decision of Dismissal of Amendment (Application No. 2014-262738) dated Apr. 19, 2019.
Japanese Decision of Refusal (Application No. 2014-262738) dated Apr. 19, 2019.
Japanese Decision of Dismissal of Amendment (Application No. 2014-262799) dated Apr. 19, 2019.
Japanese Decision of Refusal (Application No. 2014-262799) dated Apr. 19, 2019.
Japanese Decision of Dismissal of Amendment (Application No. 2014-264979) dated Apr. 19, 2019.
Japanese Decision of Refusal (Application No. 2014-264979) dated Apr. 19, 2019.
Japanese Office Action (with English translation), Japanese Application No. 2014-256524, dated Apr. 2, 2019 (7 pages).
Japanese Office Action (with English translation), Japanese Application No. 2014-262913, dated Nov. 8, 2019 (10 pages).
Indonesia Office Action (with English translation), Indonesia Application No. PI D201704028, dated Sep. 25, 2019.
Japanese Notice of Termination (with English translation), Japanese Application No. 2014-261339, dated Sep. 27, 2019 (11 pages).
Japanese Notice of Termination (with English translation), Japanese Application No. 2014-264979, dated Sep. 27, 2019 (7 pages).
Taiwanese Office Action (with English translation), Taiwanese Application No. 104141151 dated Nov. 26, 2019 (26 pages).
Indian Office Action (with English translation), Indian Application No. 201717019961, dated Oct. 16, 2019 (& pages).
Japanese Office Action (Application No. 2919-947168) dated Apr. 17, 2020 (with English Translation).
Australian Office Action (Application No. 2015361362) dated Sep. 2, 2020.
Japanese Notice of Concluding of Proceedings and the Trial/Appeal Decision (Application No. JP 2014-262682) (Trial No. 2019-3559) dated Jun. 23, 2020 (with English translation).
Chinese Office Action (Application No. 201580066162.8) dated Mar. 16, 2020 (with English Translation).
Japanese Office Action (Application No. 2019-127567) dated Sep. 11, 2020 (with English translation).
Japanese Reconsideration Report by Examiner Before Appeal (Application No. 2014-256524; Appeal No. 2019-008572) dated Dec. 13, 2019 (with English translation).
Japanese Notice of Termination of Reconsideration by Examiners Before Appeal Proceedings (Application No. 2014-256524; Appeal No. 2019-008572) dated Dec. 17, 2019 (with English translation).
Japanese Trial and Appeal Decision (Application No. 2014-256524) dated Jun. 5, 2020.
Australian Office Action (Application No. 2015361362) dated May 6, 2020.
European Office Action (Application No. 15867402.8) dated Feb. 21, 2020.
Trial and Appeal Decision (Application No. 2014-264979) (Trial No. 2019-9193) dated Aug. 14, 2020 (with English translation).
European Office Action (Appl. No. 15 867 402.8) dated Oct. 15, 2020.
Japanese Office Action (Appl. No. 2019-047168) dated Oct. 23, 2020 (with English translation).
Taiwanese Office Action (Appl. No. 109119025) dated Oct. 26, 2020 (with English translation).
Anonymous: "Adhesion—Wikipedia", Oct. 7, 2020.
Vietnamese Office Action (Application No. 1-2017-02180) dated Nov. 30, 2020 (with English translation).
Extended European Search Report (Application No. 20192902.3) dated Dec. 10, 2020.
Indian Office Action (Application No. 202018025520) dated Feb. 25, 2021.
Australian Office Action (Application No. 2015361362) dated Dec. 15, 2020.
European Office Action (Application No. 15 867 402.8) dated May 10, 2021.
Chinese Office Action (Application No. 202010511728.6) dated Jun. 16, 2021 (with English translation).
Korean Office Action (with English translation), Korean Application No. 10-2017-7015136, dated Aug. 20, 2021 (15 pages).
Singapore Office Action (with English translation), Application No. 10202006939W, dated Aug. 20, 2021 (8 pages), all pages in English, there does not appear to be any non-English language anywhere in this document.
Japanese Notification of Reason for Revocation (U.S. Pat. No. 6,819,944) (Opposition No. 2021-700669) dated Oct. 6, 2021 (with English Translation) (20 pages), only first 12 pages in English.
Voluntary Design Guidelines for Designated PET Bottles, Appendix 2: Evaluation Criteria for Labels (including Printing, Adhesives and other Components), The Council for PET Bottle Recycling (Japan), Revised on Mar. 1, 2011 (with English translation) (15 pages), only first 8 pages in English.
Australian Office Action, Australian Application No. 2021201602, dated Sep. 30, 2021 (4 pages).

* cited by examiner

FIG.11
(a)
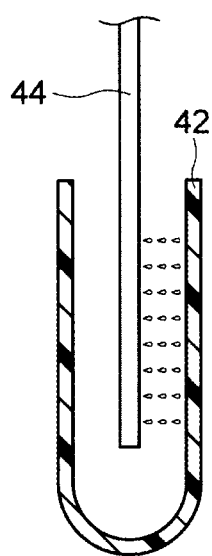
(b)
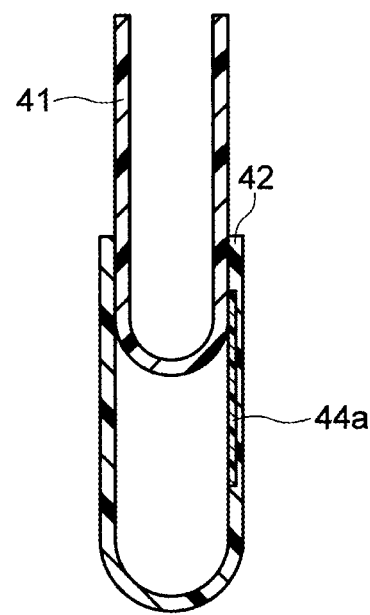
(c)
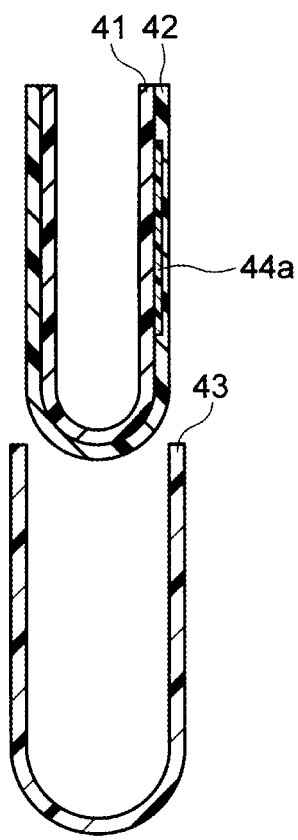
(d)
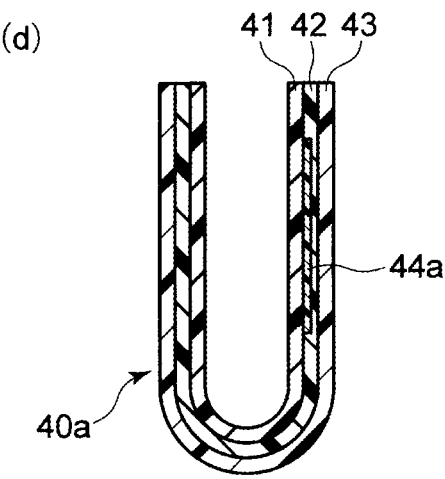

COMPOSITE PREFORM, COMPOSITE CONTAINER, COMPOSITE PREFORM, PLASTIC MEMBER, AND METHOD FOR PRODUCING COMPOSITE CONTAINER

BACKGROUND OF THE INVENTION

1. Field of the Invention

The present invention relates to a composite container, a composite preform, a plastic member, and a method for producing a composite container.

2. Description of Related Art

Recently, bottles made of plastics have been more commonly used for containing liquid contents such as drink or food. Liquid contents are contained in such plastic bottles.

Such a plastic bottle for containing liquid contents is produced by inserting a preform into a die and performing biaxial stretch blow molding on the preform.

In a conventional biaxial stretch blow molding method, a preform containing a single-layer material, multi-layer material, or blended material of PET, PP, or the like is used to be molded into the shape of a container. However, in general, a conventional biaxial stretch blow molding method is used to merely mold a preform into the shape of a container. Thus, to give various functions or characteristics (e.g., barrier properties or heat retaining properties) to a container, limited methods are available, a typical example of which is changing the material included in the preform. In particular, it is difficult to give different functions or characteristics to different parts (e.g., trunk part and bottom part) of a container.

CITATION LIST

Patent Literature

Patent Literature 1: Japanese Unexamined Patent Application Publication No. 2009-241526

The present invention has been designed in view of these points, and an object of the invention is to provide a composite container, a composite preform, and a plastic member with which various functions and characteristics can be given to the container.

SUMMARY OF THE INVENTION

A composite container according to the present invention includes:
a container body which is made of a plastic material; and
a plastic member which is disposed on an outer surface of the container body,
wherein the container body and the plastic member are integrally inflated by means of blow molding,
and wherein the plastic member includes a colored layer and/or a print layer where a print is made.

A composite container according to the present invention includes:
a container body which is made of a plastic material; and
a plastic member which is disposed on an outer surface of the container body,
wherein the container body and the plastic member are integrally inflated by means of blow molding,
and wherein the container body includes a colored layer which includes a resin material and a colorant.

In the aforementioned aspect, the plastic member preferably has a function of contracting with respect to the container body.

A composite preform according to the present invention includes:
a preform which is made of a plastic material; and
a plastic member which is disposed so as to surround the outside of the preform,
wherein the plastic member is brought in close contact with the outside of the preform,
and wherein the plastic member includes a colored layer and/or a print layer where a print is made.

A composite preform according to the present invention includes:
a preform which is made of a plastic material; and
a plastic member which is disposed so as to surround the outside of the preform,
wherein the plastic member is brought in close contact with the outside of the preform,
and wherein the preform includes a colored layer which includes a resin material and a colorant.

In the aforementioned aspect, the plastic member preferably has a function of contracting with respect to the preform.

A plastic member according to the present invention is:
a plastic member for making a composite container which includes a preform and the plastic member brought in close contact with the outside of the preform, the composite container being made by attaching the plastic member so as to surround the outside of the preform and heating the plastic member integrally with the preform,
wherein the plastic member includes a tubular trunk part covering at least a trunk part of the preform,
and wherein the plastic member includes a colored layer and/or a print layer where a print is made.

A method for producing a composite container according to the present invention includes the steps of:
preparing a preform made of a plastic material;
disposing a plastic member on the outside of the preform;
disposing a print region on a surface of the plastic member;
heating the preform and the plastic member and inserting the preform and the plastic member into a blow molding die; and
integrally inflating the preform and the plastic member by performing blow molding on the preform and the plastic member in the blow molding die.

A method for producing a composite container according to the present invention includes the steps of:
preparing a preform made of a plastic material;
disposing a plastic member on the outside of the preform, the plastic member having a print region disposed on a surface of the plastic member in advance;
heating the preform and the plastic member and inserting the preform and the plastic member into a blow molding die; and
integrally inflating the preform and the plastic member by performing blow molding on the preform and the plastic member in the blow molding die.

A method for producing a composite container according to the present invention includes the steps of:
preparing a preform made of a plastic material;
disposing a plastic member on the outside of the preform;
heating the preform and the plastic member and inserting the preform and the plastic member into a blow molding die;

integrally inflating the preform and the plastic member by performing blow molding on the preform and the plastic member in the blow molding die; and disposing a print region on a surface of the plastic member.

In the aforementioned aspect, the print region is preferably formed by an inkjet process.

BRIEF DESCRIPTION OF THE DRAWINGS

FIGS. 11(a) to 11(d) are schematic diagrams showing one embodiment in which a print is made in a plastic member.

DETAILED DESCRIPTION OF THE INVENTION

First Embodiment

A first embodiment of the present invention will now be described with reference to the drawings. FIGS. 1 to 18 are diagrams illustrating the first embodiment of the present invention.

Composite Container 10A

Figure 1:
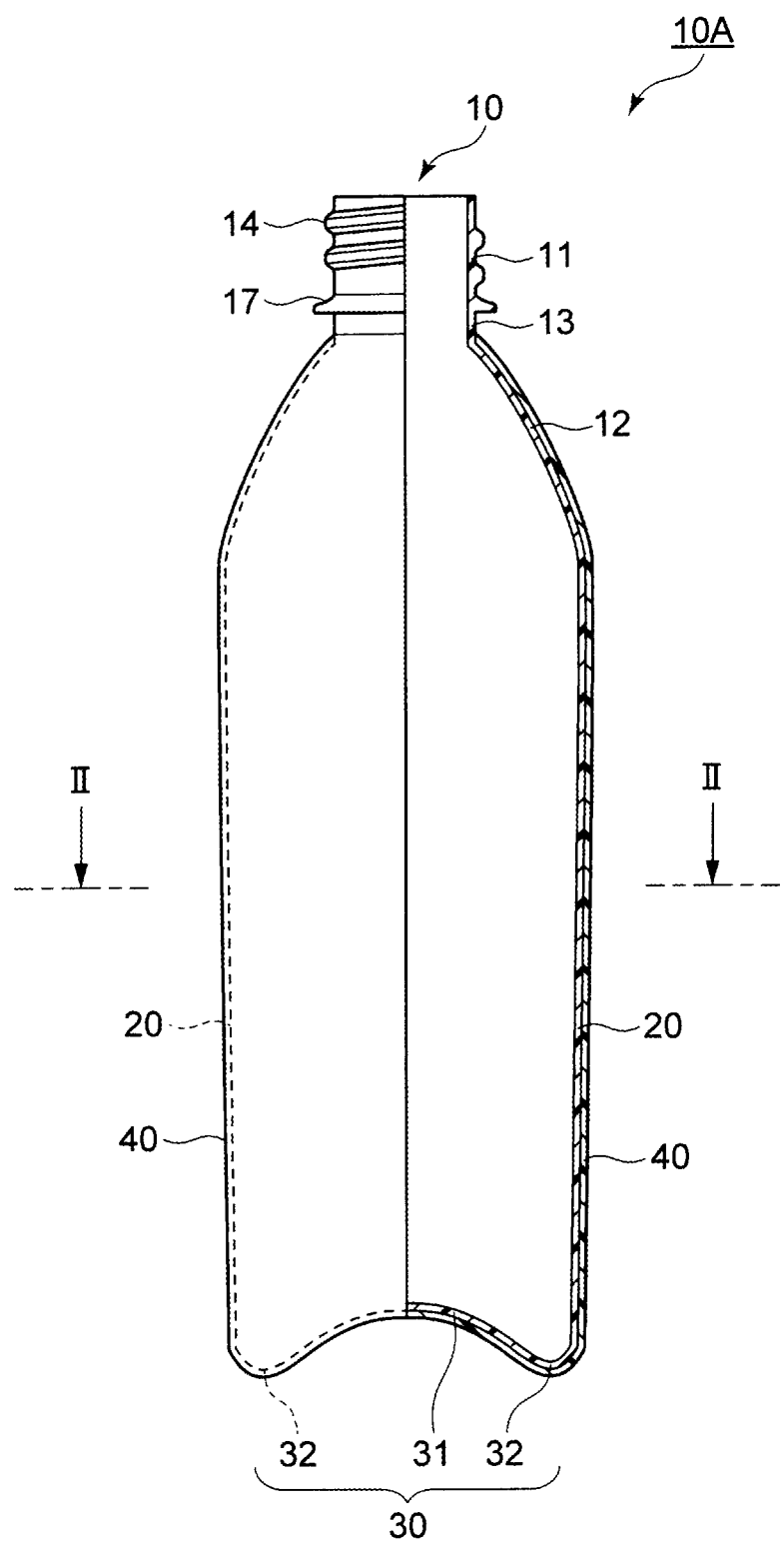
FIG. 1 is a partial vertical cross-sectional view illustrating a composite container according to one embodiment of the present invention.
Figure 2:
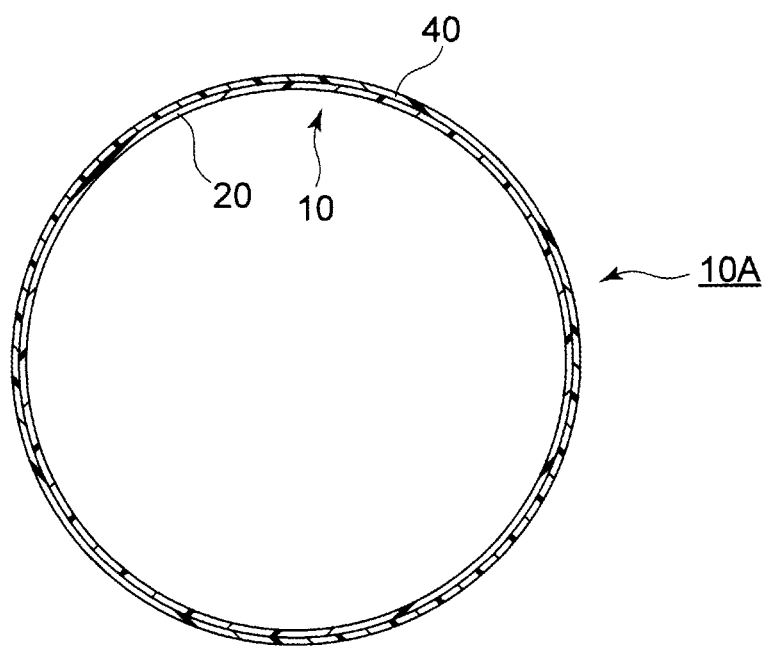
FIG. 2 is a horizontal cross-sectional view illustrating a composite container according to one embodiment of the present invention (taken along the line II-II in FIG. 1).

First, an overview of a composite container 10A made by using a blow molding method according to the present embodiment is provided with reference to FIGS. 1 and 2.

The terms "above" and "below", as used herein, refer to an upper part and a lower part, respectively, of an upright composite container 10A (FIG. 1).

As described later, the composite container 10A illustrated in FIGS. 1 and 2 is obtained by integrally inflating a preform 10a and a plastic member 40a of a composite preform 70 through biaxial stretch blow molding performed on the composite preform 70, which includes the preform 10a and the plastic member 40a (see FIG. 4), by using a blow molding die 50.

Figure 3:
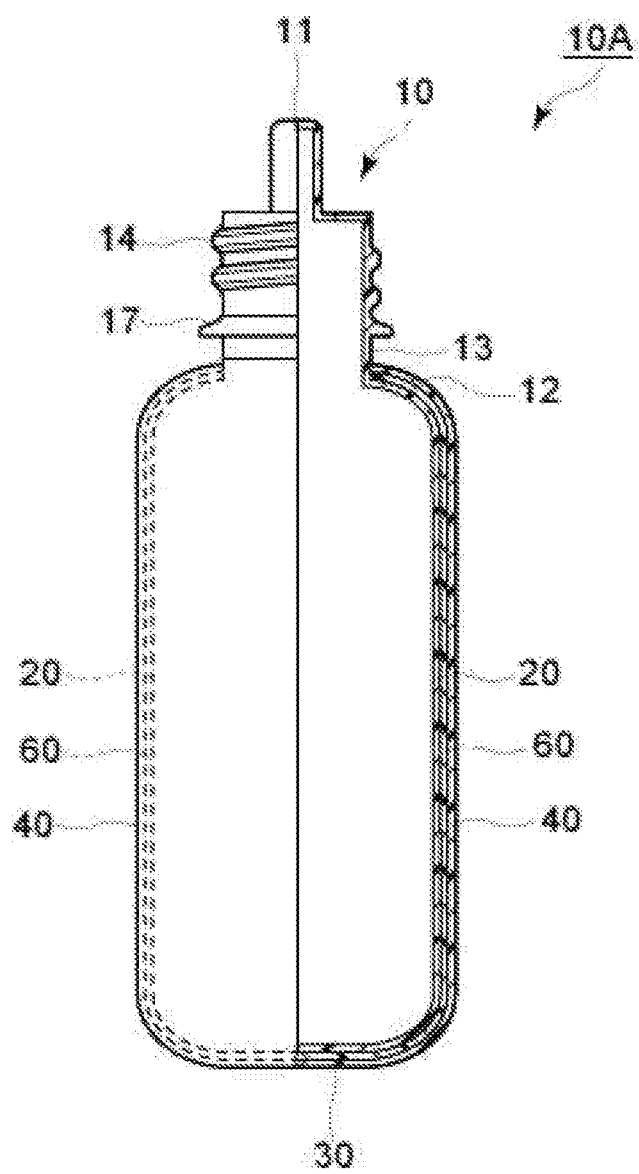
FIG. 3 is a partial vertical cross-sectional view illustrating a composite container according to one embodiment of the present invention.

The composite container 10A may be in a shape as illustrated in FIG. 3.

The composite container 10A according to the present invention includes a container body 10, which is made of a plastic material and located inside, and a plastic member 40, which is disposed in close contact with the outside of the container body 10.

On one hand, the container body 10 includes a mouth part 11, a neck part 13 disposed below the mouth part 11, a shoulder part 12 disposed below the neck part 13, a trunk part 20 disposed below the shoulder part 12, and a bottom part 30 disposed below the trunk part 20.

On the other hand, the plastic member 40 is thinly stretched and brought in close contact with the outer surface of the container body 10 so as not to easily move or turn with respect to the container body 10.

Figure 5:
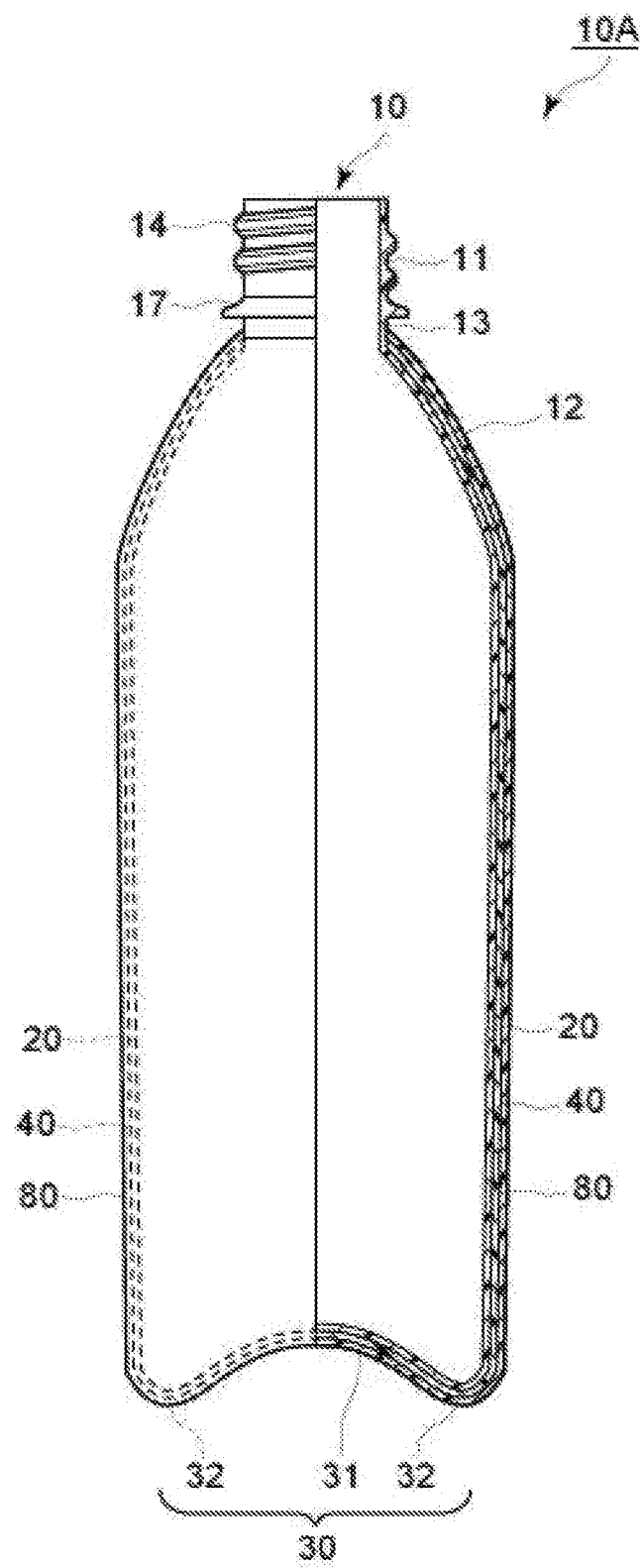
FIG. 5 is a partial vertical cross-sectional view illustrating a composite container according to one embodiment of the present invention.

In one embodiment, a surface protection layer 80 may be provided on the plastic member 40 as illustrated in FIG. 5.

Figure 6:
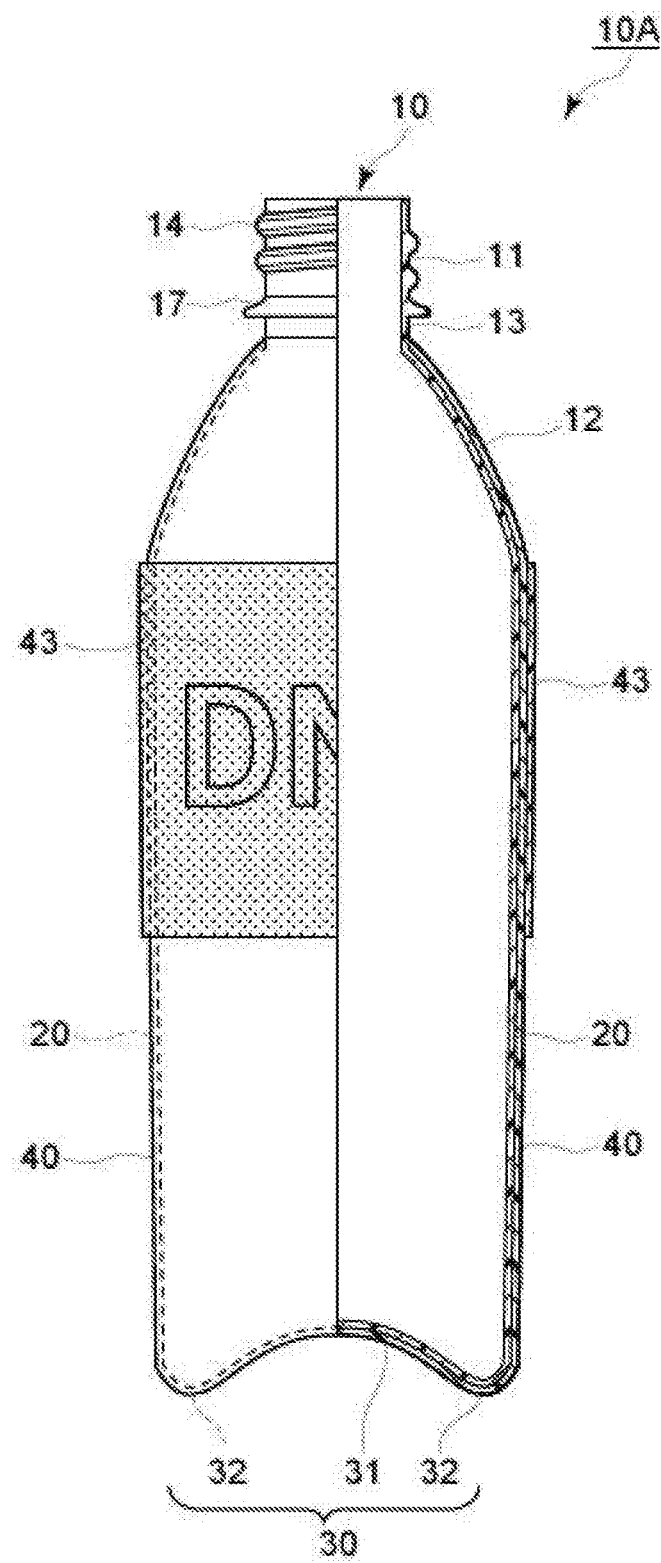
FIG. 6 is a partial vertical cross-sectional view illustrating a composite container having a label according to one embodiment of the present invention.

In one embodiment, a label 43 may be attached on the container body 10 and/or the plastic member 40 as illustrated in FIG. 6.

Container Body 10

The following describes a container body 10 in detail. As described above, the container body 10 includes a mouth part 11, a neck part 13, a shoulder part 12, a trunk part 20, and a bottom part 30.

The mouth part 11 includes a screw part 14, onto which a cap (not illustrated) will be screwed, and a flange part 17, which is disposed below the screw part 14. The mouth part 11 may be in a conventionally known shape.

The neck part 13, located between the flange part 17 and the shoulder part 12, has a substantially cylindrical shape that is substantially uniform in diameter. The shoulder part 12, located between the neck part 13 and the trunk part 20, is in a shape whose diameter gradually increases from the side of the neck part 13 toward the side of the trunk part 20.

The trunk part 20 has a cylindrical shape that is substantially uniform in diameter as a whole.

However, the trunk part 20 is not limited to such shape but may be in a polygonal cylindrical shape such as a square cylindrical or octagonal cylindrical shape. Alternatively, the trunk part 20 may be in a cylindrical shape whose horizontal cross-sections are not uniform from top to bottom. Although the trunk part 20 in the present embodiment has a surface substantially flat with no irregularities formed, this is an example only. For example, irregularities such as panels or grooves may be formed on the trunk part 20.

The bottom part 30 includes a concave part 31 located at a center, and a grounding part 32 around the concave part 31. Note that the bottom part 30 is not limited to a specific shape but may be in a conventionally known bottom shape (e.g., a petaloid or round bottom shape).

In one embodiment, the container body 10 contains a resin material. In one embodiment, the container body 10 includes a colored layer that contains a resin material and a colorant.

Examples of the resin material contained in the container body 10 include polyethylene (PE), polypropylene (PP), polyethylene terephthalate (PET), polyethylene naphthalate (PEN), and polycarbonate (PC).

Besides these resins, a nylon resin such as nylon-6, nylon-11, nylon-12, nylon-6,6, nylon-6,10, nylon-6/12, nylon-6/11, nylon-6/9, nylon-6/6,6, nylon-6/6,6/6,10, polymetaxylylene adipamide (MXD-6), or hexamethylene terephthalamide/hexamethylene isophthalamide copolymers (nylon-6T/6I) may be contained.

Among others, it is preferable that the container body 10 contains nylon-6, nylon-6,6, MXD-6, and nylon-6/6,6, which have favorable gas barrier properties.

The container body 10 may contain a polyvinyl alcohol-based resin. A polyvinyl alcohol-based resin is obtained by saponifying a vinyl ester homopolymer or a copolymer of a vinyl ester and another monomer (e.g., a copolymer of a vinyl ester and ethylene) with an alkali catalyst or the like. Vinyl acetate is a typical example of a vinyl ester compound, but other fatty acid vinyl esters, such as vinyl propionate or vinyl pivalate, may also be used. Among polyvinyl alcohol-based resins, an ethylene-vinyl alcohol copolymer (EVOH) is particularly preferable because it provides ease of melt molding, and favorable gas barrier properties under high humidity conditions.

The container body 10 may contain an ionomer resin.

The container body 10 may also contain a resin material obtained by blending any of the aforementioned resins.

Examples of the blended resin material include a blend of a thermoplastic resin and a nylon resin.

With the container body 10 containing a blended resin material obtained by blending a thermoplastic resin and a nylon resin, the molding stability of the resin material can be improved, the container body 10 can have higher gas barrier properties, and the composite container 10A as a whole can have excellent gas barrier properties even in an aspect in which the container body is not entirely covered by the plastic member 40.

As a colorant, a colorant of brown, black, green, white, blue, red, or the like may be used.

The colorant may be a pigment or dye, but is preferably a pigment in view of lightfastness.

With the container body 10 containing a colorant, a colored composite container 10A can be obtained irrespective of whether the plastic member 40 contains no colorant.

With the composite container 10A colored in a predetermined color as a whole, a visible light in a desired wavelength band can be cut off (absorbed or reflected), thereby preventing the problem of denaturing the liquid contents in the composite container 10A caused by a visible light.

In addition, if the plastic member 40 contains a colorant, the composite container 10A can have various designs by, for example, using different colorant colors between the container body 10 and the plastic member 40, thereby improving visibility.

In addition to the aforementioned effects, if a light reflective pigment such as titanium white, aluminum powder, mica powder, zinc sulfide, zinc oxide, calcium carbonate, kaolin, talc, or another white pigment, or a light absorbing pigment such as carbon black, ceramic black, bone black, or another colored pigment is contained as a colorant, an effect of further reducing the transmittance of a visible light through the post-blow molding plastic member 40 is provided, thereby preventing degradation of the liquid contents filling the composite container 10A. The colorant content is preferably 0.01 to 10 parts by mass, more preferably 0.1 to 10 parts by mass, and still more preferably 0.2 to 5 parts by mass, based on 100 parts by mass of the resin material contained in a colored layer.

The container body 10 may be composed of a single layer, or may be composed of multiple layers.

In this case, the innermost layer and the outermost layer may be composed of the same main components or different main components.

Specific examples of the layer structure include, in the order starting from the innermost, PET/MXD-6/PET, PET/PET+MXD-6/PET, and PET/EVOH/PET.

Forming an intermediate layer from a resin material having gas-barrier and light-blocking properties, such as MXD6, MXD6+fatty acid salt, polyglycolic acid (PGA), EVOH, or PEN, achieves a multi-layer bottle having gas-barrier and light-blocking properties.

At least one of these layers may contain a colorant to form a colored layer.

The container body 10 in the trunk part 20 may be as thin as, for example, without limitation, approximately 50 μm to 250 μm. The weight of the container body 10 may be, for example, without limitation, 10 g to 20 g based on a 500 ml capacity, for example. Decreasing the thickness of the container body 10 as described above can make the container body 10 lighter.

In one embodiment, the container body 10 can be made by preparing a preform 10a (described later) through injection molding of a resin material or of a mixture including a resin material and a colorant, and then performing biaxial stretch blow molding on the preform 10a.

In the case where the container body 10 is composed of a plurality of layers including a colored layer, the composite container 10 can be produced by performing coinjection molding on a mixture of a resin material and a colorant, along with any resin material.

The container body 10 may also be made by first forming a foamed preform having foamed cells in a diameter of 0.5 to 100 μm by mixing an inert gas (nitrogen gas or argon gas) with a melted thermoplastic resin and then performing the blow molding on the foamed preform. Such container body 10 contains foamed cells, and thus can enhance light-blocking properties of the entire container body 10.

Such container body 10 may be composed of a bottle having a full capacity of, for example, 100 mL to 2,000 mL. Alternatively, the container body 10 may be a large bottle having a full capacity of, for example, 10 L to 60 L.

Plastic Member 40

The following describes the Plastic member 40.

The plastic member 40 can be obtained by performing blow molding on a plastic member 40a. More specifically, the plastic member 40 can be obtained by disposing the plastic member 40a so as to surround the outside of a preform 10a, bringing the plastic member 40a in close contact with the outside of the preform 10a, and then performing biaxial stretch blow molding on the plastic member 40a with the preform 10a.

The plastic member 40 is not adhered but attached on the outer surface of the container body 10, being closely attached so as not to move or turn with respect to the container body 10.

The plastic member 40 is thinly stretched on the outer surface of the container body 10 to cover the container body 10. As illustrated in FIG. 2, the plastic member 40 is disposed over the entire region of the container body 10 in its circumferential direction so as to surround the container body 10, having a substantially circular horizontal cross section.

In this example, the plastic member 40 is disposed so as to cover the shoulder part 12, the trunk part 20, and the bottom part 30 of the container body 10 excluding the mouth part 11 and the neck part 13. This enables desired functions and characteristics to be given to the shoulder part 12, the trunk part 20, and the bottom part 30 of the container body 10.

Note that the plastic member 40 may be disposed on the whole or part of the container body 10 excluding the mouth part 11.

For example, the plastic member 40 may be disposed so as to entirely cover the neck part 13, the shoulder part 12, the trunk part 20, and the bottom part 30 of the container body 10 excluding the mouth part 11.

Alternatively, the plastic member 40 may be disposed so as to cover, for example, the bottom part 30 only.

In addition, the number of disposed plastic members 40 may be two or more as well as one. For example, two plastic members 40 may be disposed: one on the outer surface of the shoulder part 12, and the other on the outer surface of the bottom part 30. The plastic member 40 may be composed of a single layer or multiple layers.

The plastic member 40 (40a) may contain a resin material. Examples of the resin material that may be contained include PE, PP, PET, PEN, poly-4-methylpentene-1, polystyrene, AS resin, ABS resin, polyvinyl chloride, polyvinylidene chloride, polyvinyl acetate, polyvinyl alcohol, polyvinyl acetal, polyvinyl butyral, diallyl phthalate resin, fluorine-based resin, polymethyl methacrylate, polyacrylic acid, polymethyl acrylate, polyacrylonitrile, polyacrylamide, polybutadiene, polybutene-1, polyisoprene, polychloroprene, ethylene propylene rubber, butyl rubber, nitrite rubber, acrylic rubber, silicone rubber, fluorine-contained rubber, nylon 6, nylon 6,6, nylon MXD6, aromatic polyamide, polycarbonate, polyethylene terephthalate, polybutylene terephthalate, polyethylene naphthalate, U polymer, liquid crystal polymer, modified polyphenylene ether, polyether ketone, polyether ether ketone, unsaturated polyester, alkyd resin, polyimide, polysulfone, polyphenylene sulfide, polyethersulfone, silicone resin, polyurethane, phenolic resin, urea resin, polyethylene oxide, polypropylene oxide, polyacetal, epoxy resin, and ionomer resin.

It is preferable to contain a thermoplastic and non-elastic resin material such as PE, PP, PET, or PEN, among others.

Containing PE, PP, and/or PET contributes to better wettability of the layer on which a print is made, thereby improving print quality.

In addition, containing PEN can provide better gas barrier properties against oxygen, water vapor, carbon dioxide, carbonic acid gas, and the like and better ray barrier properties against ultraviolet rays and the like, thereby further preventing carbonic acid gases from coming out through the container.

Containing PEN can also improve the mechanical strength.

In the case where the plastic member 40a is formed in a single layer, the content of PEN in the plastic member 40a is preferably at least 20% by mass, more preferably at least 50% by mass, still more preferably at least 90% by mass, based on the total mass of the resin material. In the case where the plastic member 40a is formed in multiple layers, the content of PEN is preferably at least 20% by mass, more preferably at least 50% by mass, and still more preferably at least 90% by mass, based on the total mass of the resin material contained in the layer that includes PEN.

The plastic member 40 (40a) may contain, as a resin material, a copolymer obtained by copolymerization of two or more different monomer units included in the aforementioned resins. In addition, the plastic member 40 (40a) may contain two or more different resin materials mentioned above.

Light blocking properties can be enhanced by using a foamed member that is obtained by mixing an inert gas (nitrogen gas or argon gas) with a melted thermoplastic resin and that has foamed cells in a diameter of 0.5 to 100 μm, and performing molding on the foamed preform.

In one embodiment, the plastic member 40 (40a) may contain an ultraviolet absorber. The ultraviolet absorber may be contained in a colored layer, which is described later, or in a print layer.

Examples of the ultraviolet absorber include a benzotriazole-based ultraviolet absorber, a triazine-based ultraviolet absorber, a benzophenone-based ultraviolet absorber, and a benzoate-based ultraviolet absorber.

In the case where the plastic member 40 is formed in a single layer, the content of an ultraviolet absorber is preferably 0.01 to 10 parts by mass, and more preferably 0.1 to 3 parts by mass, based on 100 parts by mass of the resin material contained in the the plastic member 40. In the case where the plastic member 40 is formed in multiple layers, the content of an ultraviolet absorber is preferably 0.01 to 10 parts by mass, and more preferably 0.1 to 3 parts by mass, based on 100 parts by mass of the resin material contained in the layer of the plastic member 40 containing the ultraviolet absorber.

The plastic member 40 has an ultraviolet ray transmittance of, preferably 5% or less, more preferably 3% or less, and still more preferably 1% or less.

An ultraviolet ray is a light beam with a wavelength of 10 nm to 400 nm. The expression "an ultraviolet ray transmittance of 5% or less" means a transmittance of 5% or less over the entire wavelength region (10 nm to 400 nm) of an ultraviolet ray.

Visible light and ultraviolet ray transmittances can be measured by using a method compliant with JIS A5759. For example, with the spectrophotometer (UV3100, produced by Shimadzu Corporation), light transmittances for visible light and ultraviolet wavelengths can each be obtained by taking measurements at every 0.5 nm in a wavelength range of 10 nm to 400 nm.

In one embodiment, the plastic member 40 (40*a*) may contain the same material as that contained in the container body 10 (preform 10*a*).

In this case, the plastic member 40 having its layer may be disposed on a specific portion of the composite container 10A, the portion being desired to be strong, thereby selectively increasing the strength of the portion. For example, the plastic member 40 may be disposed around the shoulder part 12 and around the bottom part 30 of the container body 10 so as to increase the strength of these portions. Examples of the material for such plastic member 40 include thermoplastic resins, in particular, PE, PP, PET, PEN, or PC, and an ionomer resin.

For example, the container body 10 may contain PET of 80% by mass and PP of 20% by mass, while the plastic member 40 serving as a wall thickening member may contain PET of 75% by mass and PP of 25% by mass.

The plastic member 40 (40*a*) may contain a material having gas barrier properties such as oxygen barrier properties or water vapor barrier properties. In this case, it is made possible to improve the gas barrier properties of the composite container 10A, thereby preventing the liquid contents from deteriorating due to oxygen and from decreasing in amount due to transpiration of water vapor, without the need for using a multi-layer preform or a preform containing a blended material as the preform 10*a*. For example, the plastic member 40 may be disposed over the shoulder part 12, the neck part 13, the trunk part 20, and the bottom part 30 of the container body 10, thereby enhancing the gas barrier properties of these parts. Examples of the material for such parts include PE, PP, MXD-6 (nylon), and EVOH (ethylene vinyl alcohol copolymer). It is also possible to mix any of these materials with an oxygen absorber such as a fatty acid salt.

The plastic member 40 (40*a*) may contain a material having ray barrier properties against ultraviolet and other rays. In this case, it is made possible to enhance the ray barrier properties of the composite container 10A, thereby preventing the liquid contents from deteriorating due to ultraviolet and other rays, without the need for using a multi-layer preform or a preform containing a blended material as the preform 10*a*. For example, the plastic member 40 may be disposed over the shoulder part 12, the neck part 13, the trunk part 20, and the bottom part 30 of the container body 10, thereby enhancing the ultraviolet ray barrier properties of these parts. Examples of such materials may include a blended material, or a material obtained by adding a light blocking resin to PET, PE, or PP. Alternatively, a foamed member having foamed cells in a diameter of 0.5 to 100 μm may be used, the foamed member being made by mixing an inert gas (nitrogen gas or argon gas) with a melted thermoplastic resin.

The plastic member 40 (40*a*) may contain a material having better heat or cold retaining properties (i.e., material of lower thermal conductivity) than the plastic material included in the container body 10 (preform 10*a*). In this case, it is made possible to reduce thermal conduction from the liquid contents to the surface of the composite container 10A, without the need for increasing the thickness of the container body 10 itself. As a result, the heat or cold retaining properties of the composite container 10A can be enhanced. For example, the plastic member 40 may be disposed on the whole or part of the trunk part 20 of the container body 10 to enhance the heat or cold retaining properties of the trunk part 20. Further, the user is protected from encountering the difficulty in holding the composite container 10A that would be too hot or too cold. Examples of such materials may include foamed polyurethane, polystyrene, PE, PP, phenolic resin, polyvinyl chloride, urea resin, silicone, polyimide, and melamine resin. Alternatively, a foamed member having foamed cells in a diameter of 0.5 to 100 μm may be used, the foamed member being made by mixing an inert gas (nitrogen gas or argon gas) with a melted thermoplastic resin. It is preferable that the resin material containing any of such resins is mixed with hollow particles. An average particle diameter of the hollow particles is preferably 1 to 200 μm, and more preferably 5 to 80 μm. The "average particle diameter" means a mean volume diameter, which can be measured using a known method with a grain-size distribution and particle-size distribution measuring device (for example, Nanotrac Particle Size Analyzer produced by Nikkiso Co., Ltd.). The hollow particles may be organic hollow particles composed of resins or the like, or may be inorganic hollow particles composed of glass or the like, but are preferably organic hollow particles because of their excellent dispersion properties. Examples of a resin included in organic hollow particles may include a styrene-based resin such as a crosslinked styrene-acrylic resin, a (meth)acrylic resin such as an acrylonitrile-acrylic resin, a phenol-based resin, a fluorine-based resin, a polyamide-based resin, a polyimide-based resin, a polycarbonate-based resin, and a polyether-based resin. Commercially available hollow particles may also be used, including, for example, ROPAQUE HP-1055, ROPAQUE HP-91, ROPAQUE OP-84J, ROPAQUE ULTRA, ROPAQUE SE, and ROPAQUE ST (produced by Rohm and Haas Company); Nipol MH-5055 (produced by Nippon Zeon Co., Ltd.); and SX8782 and SX866 (produced by JSR Corporation). The content of hollow particles is preferably 0.01 to 50 parts by mass, and more preferably 1 to 20 parts by mass, based on 100 parts by mass of the resin material included in the layer of the plastic member 40 containing the hollow particles.

The plastic member 40 (40*a*) may contain a material that is less slippery than the plastic material included in the container body 10 (preform 10*a*). In this case, it can be made easier for the user to grip the composite container 10A without the need for changing the material of the container body 10. For example, the plastic member 40 may be disposed on the whole or part of the trunk part 20 of the container body 10 to make it easier to hold the trunk part 20.

In addition to the aforementioned resins used as main components, any of various additives may be added to the plastic member 40 (40a) to the extent that the characteristics of the plastic member 40 (40a) remain intact. Examples of the additives that may be added include plasticizers, ultra-violet stabilizers, color protectors, delusterants, deodorants, flame retardants, weatherproofers, anti-static agents, anti-yarn friction agents, slip agents, release agents, antioxidants, ion exchange agents, lubricants, and coloring pigments.

In one embodiment, the plastic member 40 includes a colored layer and/or a print layer having a region on which a print is made (a print region).

Colored Layer

A colored layer may contain any of the aforementioned resin materials and a colorant.

As the colorant, a colorant of brown, black, green, white, blue, red, or the like may be used.

With the plastic member 40 (40a) containing a colorant of a predetermined color, a visible light in a desired wavelength band can be cut off (absorbed or reflected), thereby preventing the problem of denaturing the liquid contents in the composite container 10A caused by a visible light.

For example, assuming that the container is loaded with beer as the contents, a visible light of a wavelength of 400 to 500 nm needs to be cut off. In this case, coloring the plastic member 40 (40a) brown as a whole by containing a brown colorant in the colored layer of the plastic member 40 (40a) can cut off the visible light of a wavelength of 400 to 500 nm, thereby preventing the contents, i.e., beer, from being denatured.

A visible light, as used herein, is a ray of light with a wavelength from 380 nm to 800 nm. Visible light transmittances can be measured by using a method compliant with JIS A5759. For example, with the spectrophotometer (UV3100, produced by Shimadzu Corporation), light transmittances for visible light wavelengths can be obtained by taking measurements at every 0.5 nm in a wavelength range of 220 to 800 nm.

The colorant may be a pigment or dye, but is preferably a pigment in view of lightfastness. Preferable pigments, among others, are light reflecting pigments and light absorbing pigments.

Examples of a light reflecting pigment include titanium white, aluminum powder, mica powder, zinc sulfide, zinc oxide, calcium carbonate, kaolin, and talc, while examples of a light absorbing pigment include carbon black, ceramic black, and bone black.

With the plastic member 40 (40a) containing a light reflecting colorant and/or a light absorbing colorant, a visible light of a wavelength in a wider range can be cut off to prevent the contents filling the composite container 10A from being denatured. Among the aforementioned colorants, light absorbing pigments of black, brown, and similar colors are more preferred because they can significantly reduce the transmittance of a visible light in the plastic member 40.

Note that a colored layer may contain two or more of the aforementioned colorants, and the plastic member 40 may include two or more colored layers.

The colorant content in a colored layer is preferably 0.01 to 10 parts by mass, more preferably 0.1 to 3.0 parts by mass, and still more preferably 0.5 to 2.0 parts by mass, based on 100 parts by mass of the resin material contained in a colored layer. As long as the colorant content is within the ranges above, a change in the resin performance in the colored layer can be minimized to the extent possible, and the molding can be performed with stable color tone.

Print Layer

Figure 7:
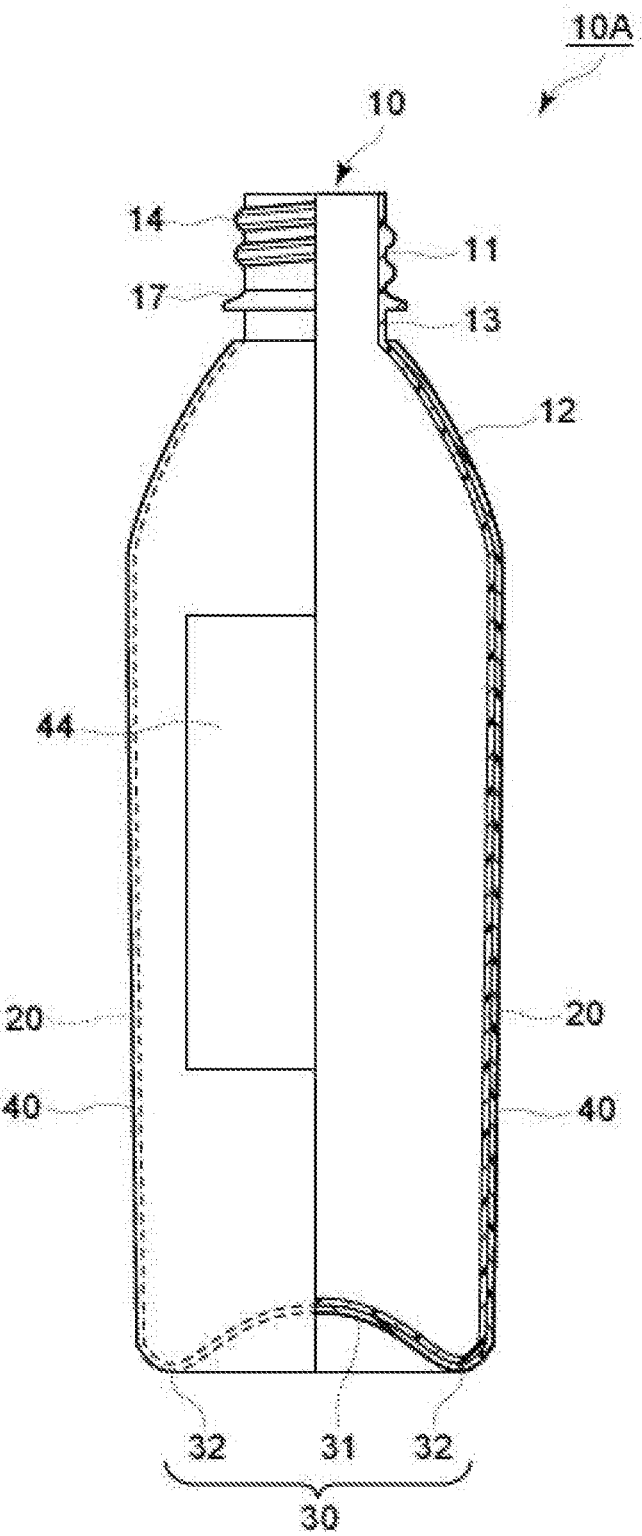
FIG. 7 is a partial vertical cross-sectional view illustrating a composite container according to one embodiment of the present invention.

As illustrated in FIG. 7, a print layer has a region on which a design or letters are printed, i.e., a print region 44 (44a). FIG. 7 shows that a print is made on the outside of the outer layer of the plastic member 40, but this is only an example; a print may be made on the inside or outside of any layer forming part of the plastic member 40.

With the plastic member 40 including a print layer, images and/or letters can be displayed on the composite container 10A without the need for attaching a separate label on the container body 10. For example, the plastic member 40 may be disposed on the whole or part of the trunk part 20 of the container body 10 to display images and/or letters on the trunk part 20.

In addition, the print region 44 (44a) may be formed on the outside or the inside of a layer included in the plastic member 40.

Printing processes including, for example, the inkjet process, the rotogravure printing process, the offset printing process, and the flexography process may be used.

The print may be made on the plastic member 40 of the composite container 10A that has undergone blow molding. Alternatively, the print may be made on a resin film prior to lamination, which is described later, or may be made on a single-layer plastic resin tube prior to lamination. Alternatively, the print may be made on the plastic member 40a that is not attached on the preform 10a yet, or may be made on the plastic member 40a that has been disposed on the outside of the preform 10a.

It is preferable that a surface treatment, such as corona treatment, low-temperature plasma treatment, or frame treatment, is given on the area where a print region will be formed on the plastic member 40. Giving such surface treatment provides better wettability on the surface of a resin film or resin tube, thereby improving print quality.

In one embodiment, it is preferable to form an anchor coat layer in advance on the plastic member 40. Providing an anchor coat layer improves adhesion of ink to the plastic member 40 (40a). Thus, the need for a pre-treatment, such as corona treatment, is eliminated. Providing an anchor coat layer also helps to prevent blurred prints.

As described above, the plastic member 40 may be composed of a single layer or multiple layers, and the innermost layer and the outermost layer on the innermost surface and the outermost surface may be composed of the same resin material or of different resin materials.

Specific examples of the layers may include low-density PE+/adhesion layer/EVOH/adhesion layer/low-density PE, PP/adhesion layer/EVOH/adhesion layer/PP, and low-density PE/adhesion layer/low-density PE+colorant (colored layer).

At least one of these layers may contain a colorant to be a colored layer, or may have a print thereon to be a print layer.

Examples of an adhesive included in an adhesion layer include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

The plastic member 40 is not welded or adhered to the container body 10, and thus the plastic member 40 can be peeled off from the container body 10.

Specifically, the plastic member 40 can be cut out with a tool such as a cutter, or can be peeled off by cutting along a cutting line (not illustrated) which is provided in advance on the plastic member 40. Hence, the plastic member 40 on which a print is made can be separated and removed from the container body 10, which means the clear and colorless container body 10 can be recycled as in a conventional manner.

An example of the thickness of the plastic member 40 attached on the container body 10 may be, without limitation, approximately 5 μm to 50 μm.

Surface Protection Layer 80

In one embodiment, the composite container 10A may include a surface protection layer 80 disposed on the plastic member 40, as illustrated in FIG. 5. The surface protection layer 80 is responsible for protecting the plastic member 40.

The surface protection layer 80 may be disposed so as to cover not only the plastic member 40 but also the whole or part of the container.

The surface protection layer 80 may or may not be colored. Although the protection layer may be transparent or opaque, in the case where a print is made in the plastic member 40, the protection layer is preferably transparent in view of maintaining the print quality.

In one embodiment, the surface protection layer 80 is thinly stretched on the outer surface of the plastic member 40 to cover at least the plastic member 40. The surface protection layer 80 is disposed over the entire region of the plastic member 40 and container body 10 in their circumferential direction so as to surround the plastic member 40 and the container body 10, having a substantially circular horizontal cross section.

In one embodiment, the surface protection layer 80 is disposed so as to cover the shoulder part 12, the trunk part 20, and the bottom part 30 of the container body 10 excluding the mouth part 11 and the neck part 13, as well as to cover the plastic member 40.

Note that the surface protection layer 80 may be disposed on the whole or part of the container body 10 and of the plastic member 40.

For example, the surface protection layer 80 may be disposed so as to cover only the printed portion or the colored portion on the plastic member 40. In addition, the number of disposed surface protection layers 80 may be two or more as well as one.

Preferably, the surface protection layer 80 contains a heat curable resin or an ionizing radiation curable resin, and more preferably, the surface protection layer 80 contains an ionizing radiation curable resin because it provides higher surface hardness and excellent productivity. An ionizing radiation curable resin may be used in conjunction with a heat curable resin.

As the ionizing radiation curable resin, any resin that can cause a polymerization and cross-linking reaction when irradiated with ionizing radiation, such as an ultraviolet or electron ray, may be used, without particular limitation. Examples of such resins include polyester resins, polyether resins, acrylic resins, epoxy resins, polyurethane resins, alkyd resins, spiroacetal resins, polybutadiene resins, polythiol-polyene resins, and polyhydric alcohols.

More specifically, the examples may include ethyl(meth)acrylate, ethylhexyl(meth)acrylate, styrene, methylstyrene, and N-vinylpyrrolidone, each of which has one unsaturated bond; polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate, each of which has two or more unsaturated bonds; and a reaction product of any of the foregoing compounds with (meth)acrylate or the like.

The term "(meth)acrylate", as used herein, refers to methacrylate and acrylate.

It is further preferable to use any of these resins in conjunction with a photopolymerization initiator, such as acetophenones, benzophenones, or benzyls.

Examples of heat curable resins include phenolic resins, urea resins, diallyl phthalate resins, melamine resins, guanamine resins, unsaturated polyester resins, polyurethane resins, epoxy resins, aminoalkyd resins, melamine-urea co-condensed resins, silicone resins, and polysiloxane resins.

It is further preferable to use any of these resins in conjunction with a thermal polymerization initiator, a hardening accelerator, a hardener, or the like.

The surface protection layer 80 (80a) can be formed by applying and curing a coating slip containing any of the aforementioned resin compositions using a printing process such as the inkjet process, the rotogravure printing process, the offset printing process, or the flexography process.

It is preferable to use the inkjet process, among others, because of its abilities to adjust the coating area and shape of the coating slip, to reduce the amount of a consumed coating slip, and to reproduce patterns with glossy texture.

The inkjet process is also favorable in that it can reduce the number of required processes because both forming the surface protection layer 80 (80a) and making a print on the plastic member 40 (40a) can be performed within a single device.

Specifically, the surface protection layer 80 (80a) can be formed by using the inkjet process to apply a coating slip on at least the surface of the plastic member 40 (40a), and then irradiating the slip with ionizing radiation to cure the slip.

As the ionizing radiation, electromagnetic rays or charged particles having an enough energy for causing a curing reaction in molecules of ionizing radiation curable resins are used. Ultraviolet rays or electron beams are usually used, but visible rays, X-rays, or ion rays may also be used.

The surface protection layer 80a (80) can be formed, for example, on the plastic member 40a that is not attached on the preform 10a yet.

Alternatively, the surface protection layer 80a (80) can be formed on the plastic member 40a and/or the preform 10a, which is included in the composite preform 70 that has not undergone blow molding yet.

Alternatively, the surface protection layer 80a (80) can be formed on the plastic member 40 and/or the container body 10, which is/are included in the composite container that has undergone blow molding.

In addition, the surface protection layer 80a (80) can be formed on a resin sheet that has not been molded into the plastic member 40a yet.

An example of the thickness of the surface protection layer 80 attached on the container body 10 may be, without limitation, approximately 1 μm to 20 μm.

Label 43

In one embodiment, a label 43 is attached on the container body 10 and/or the plastic member 40 of the composite container 10A as illustrated in FIG. 6.

Examples of the label 43 may include a shrink label, a stretch label, a roll label, a tack label, a paper label, and a label hung with a string from the neck part 13 of the composite container 10A (hereinafter called a "hung label" if appropriate). It is preferable to use a shrink label, a stretch label, or a roll label, among others, because of their high productivity.

It is preferable that a print region where a print is made is disposed on the label 43. In addition to the artwork and product name, text information including the names of the liquid contents, manufacturer, and raw materials may be displayed on the print region. The label 43 may be colored, in part or in whole, in red, blue, yellow, green, brown, black, white, or the like, and may be transparent or opaque.

Figure 8:
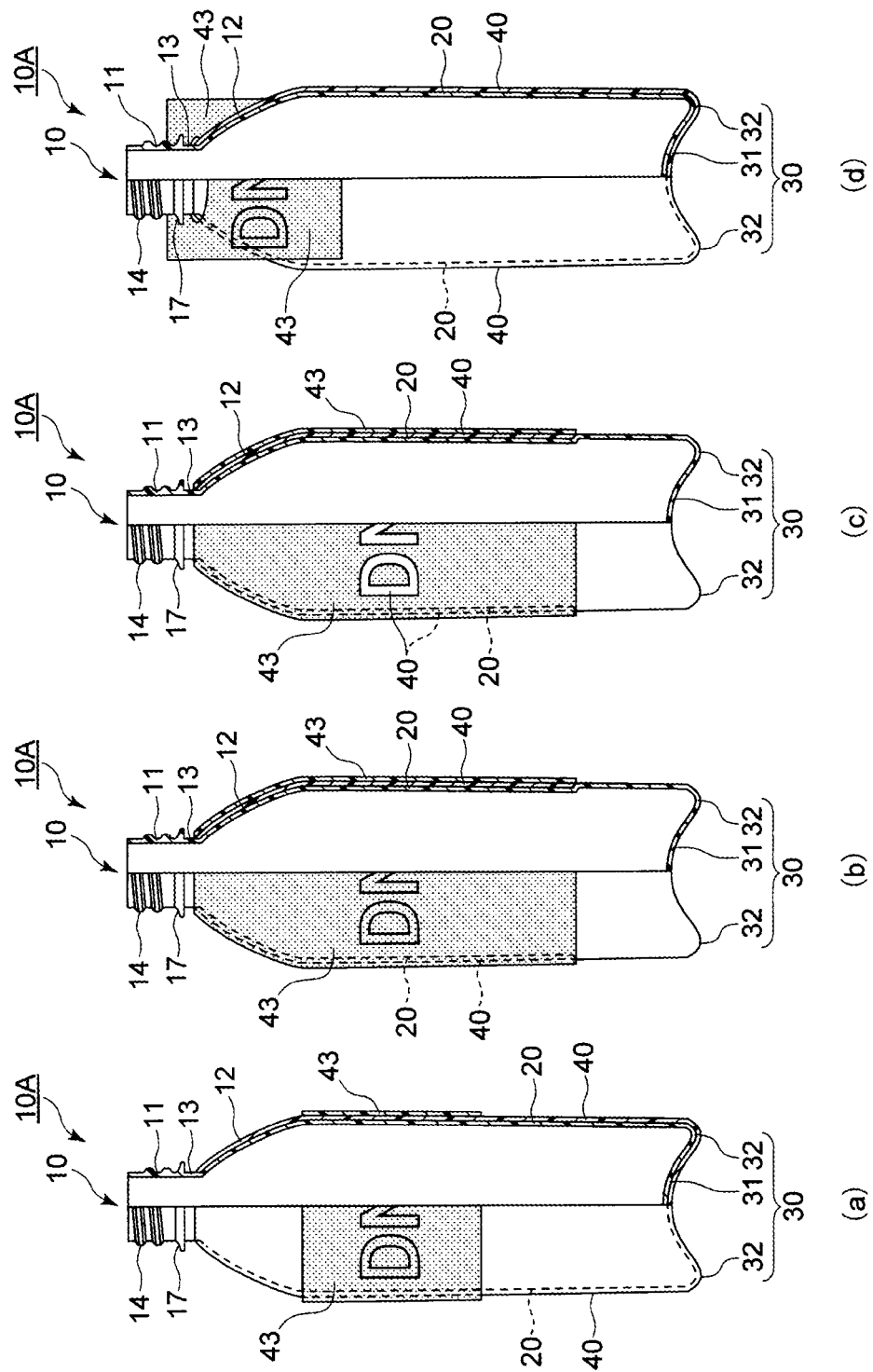
FIG. 8 is a partial vertical cross-sectional view illustrating a composite container having a label according to one embodiment of the present invention.

An example of the composite container 10A that includes the label 43 may be, as illustrated in FIG. 8(*a*), the one with the attached label 43 covering part of the composite container 10 and plastic member 40.

Another example may be, as illustrated in FIG. 8(*b*), the one with the attached label 43 covering the whole plastic member 40.

Still another example may be, as illustrated in FIG. 8(*c*), the one configured such that the label 43 is disposed to cover the whole plastic member 40, the letters in the label are transparent, and the plastic member 40 is colored.

Still another example may be, as illustrated in FIG. 8(*d*), the one with the label 43 having letters hung from the neck part 13 of the composite container 10A.

In addition to the above examples, other configurations (not illustrated) may be possible; for example, separate artworks to be superimposed are printed beforehand on the plastic member 40 and the label 43, and then the plastic member 40 and the label 43 are superimposed on each other to create a single complete image or a stereoscopic effect.

The following describes aspects of the above-mentioned labels.

A shrink label can be wrapped around to cover the container body 10 and/or the plastic member 40 in part or in whole. The shrink label can be obtained by attaching a shrink label on the container body 10 and/or the plastic member 40 and then performing shrink-wrapping at a temperature of 80 to 90 degrees.

The shrink label can be made by using a resin film, such as a polylactic acid-based film, a polystyrene-based film, a polyester-based film, a low-density polyethylene film, a medium-density polyethylene film, a high-density polyethylene film, a low-density linear polyethylene film, a cyclic polyolefin film, a polypropylene film, a strech polyolefin film formed of resins such as ethylene-propylene copolymers, ethylene-vinyl acetate copolymers, ionomer resins, ethylene-acrylate copolymers, ethylene-methyl acrylate copolymers, a polyester-polystyrene multi-layer film, a laminated film of non-woven fabric and a shrink film, a polyester-polystyrene coextruded film, a polyamide film such as a 6-nylon or 6,6-nylon film, a modified polyolefin film formed of resins such as chlorinated polyethylene or chlorinated polypropylene, a film formed of resins of vinyl chloride-vinyl acetate copolymers, and an acrylic resin film.

As for the aforementioned films, any of the following various resin films may be used: a single-layer film formed with one or more types of component resins using a film-forming process such as the extrusion process, the cast molding process, the T-die process, the cutting process, the inflation process, or the like; a multi-layer film formed with two or more types of resins by co-extrusion or the like; and a film formed by mixing two or more types of resins and stretching the film uniaxially or biaxially using the tubular method, the tenter method, or the like. However, a uniaxially stretched film stretched in the flow direction is preferred. These films may be foamed films.

Films that can be suitably used in the present invention include, for example, stretched polyester-based films, stretched polystyrene-based films, stretched polyolefin-based films, polylactic acid-based films, foamed polyolefin-based films, stretched polyester-polystyrene coextruded films, foamed polystyrene-based films, and polyester-polystyrene multi-layer films, because of their excellent thermal insulation. A laminated film formed of non-woven fabric and any of the aforementioned films may also be used. A stretched film may be uniaxially stretched or biaxially stretched, and a uniaxially stretched film may be stretched in the longitudinal direction or in the transverse direction.

An example of the thickness of the shrink label attached on the composite container 10A may be, without limitation, approximately 10 μm to 80 μm.

As with the shrink label, a stretch label can be wrapped around to cover the container body 10 and/or the plastic member 40 in part or in whole. The stretch label wrapped around the composite container 10A can be obtained by fitting the label onto the composite container 10A while pulling the label in the circumferential direction, and then by removing the pulling force, which allows the label to shrink and follow the composite container 10A.

The stretch label can be made by using a single-layer or multi-layer resin film composed of a thermoplastic resin film with moderate flexibility, such as, for example, low-density polyethylene, medium-density polyethylene, high-density polyethylene, low-density linear polyethylene, polypropylene, or other polyolefin resins. Among others, a single-layer film composed of low-density linear polyethylene or a multi-layer film having a layer composed of low-density linear polyethylene is preferably used to make the stretch label. These films can be made by using the method described above.

An example of the thickness of the stretch label attached on the composite container 10A may be, without limitation, approximately 5 μm to 50 μm.

As with the shrink label, a roll label and a tack label each can be wrapped around to cover the container body 10 and/or the plastic member 40 in part or in whole. The roll label can be obtained by wrapping a resin film around the composite container and sticking or fusing an end of the resin film onto the container. The tack label can be obtained by directly attaching a resin film on the composite container mediated by an adhesive or the like.

Both the roll label and the tack label can be made by using any of the aforementioned resin films. Examples of the adhesive include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

An example of the thickness of the roll label or the tack label attached on the composite container 10A may be, without limitation, approximately 5 μm to 100 μm.

As with the shrink label, a paper label can be wrapped around to cover the container body 10 and/or the plastic member 40 in part or in whole. As with the tack label, the paper label can be obtained by directly attaching a resin film on the composite container mediated by an adhesive or the like.

To make the paper label, it is preferable to use highly water-resistant paper impregnated with, for example, a polyisocyanate compound.

An example of the thickness of the paper label attached on the composite container 10A may be, without limitation, approximately 50 μm to 300 μm.

A hung label can be obtained by hanging a label made of a resin film or paper with, for example, a string, from the neck part 13 of the composite container 10A. The label is not limited to any specific size and thickness, and thus the label in any size and thickness may be used.

Composite Preform 70

A configuration of the composite preform 70 according to the present embodiment will now be described with reference to FIG. 4.

Figure 4:
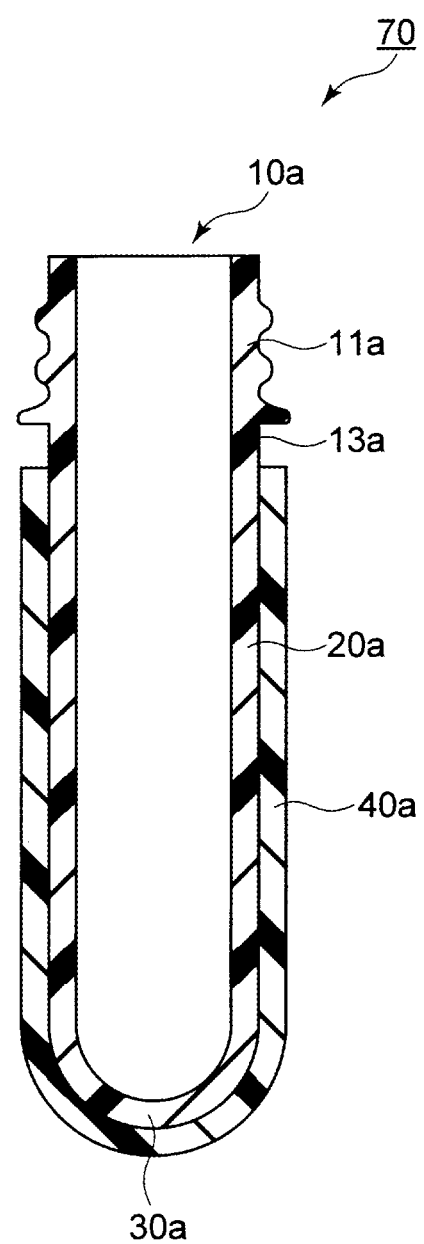
FIG. 4 is a vertical cross-sectional view illustrating a composite preform according to one embodiment of the present invention.

As illustrated in FIG. 4, the composite preform 70 includes the preform 10a made of a plastic material, and the plastic member 40a being bottom-closed cylindrical and disposed on the outside of the preform 10a.

Figure 9:
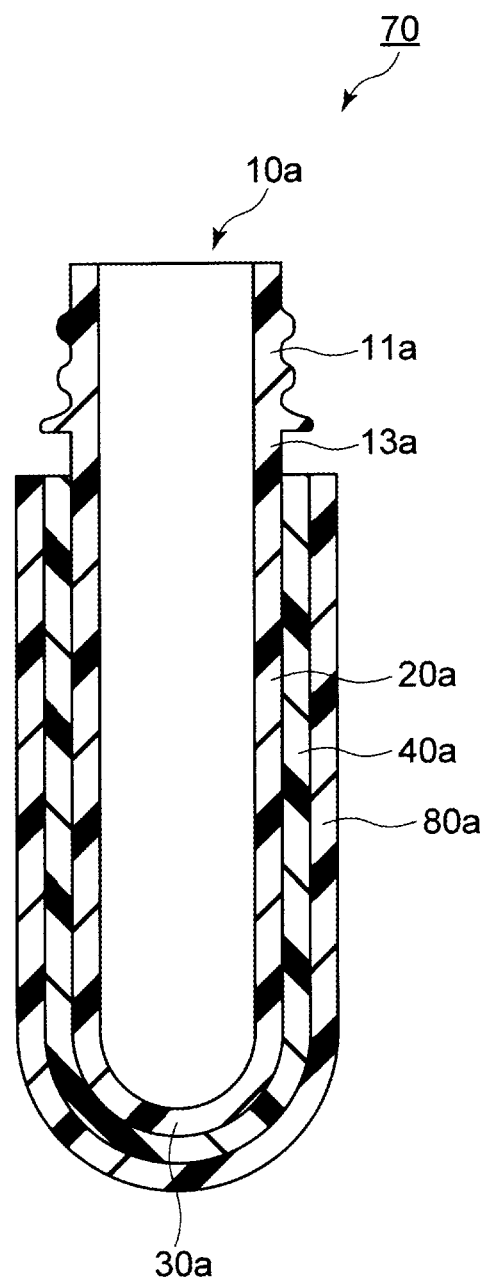
FIG. 9 is a vertical cross-sectional view illustrating a composite preform according to one embodiment of the present invention.
Figure 10:
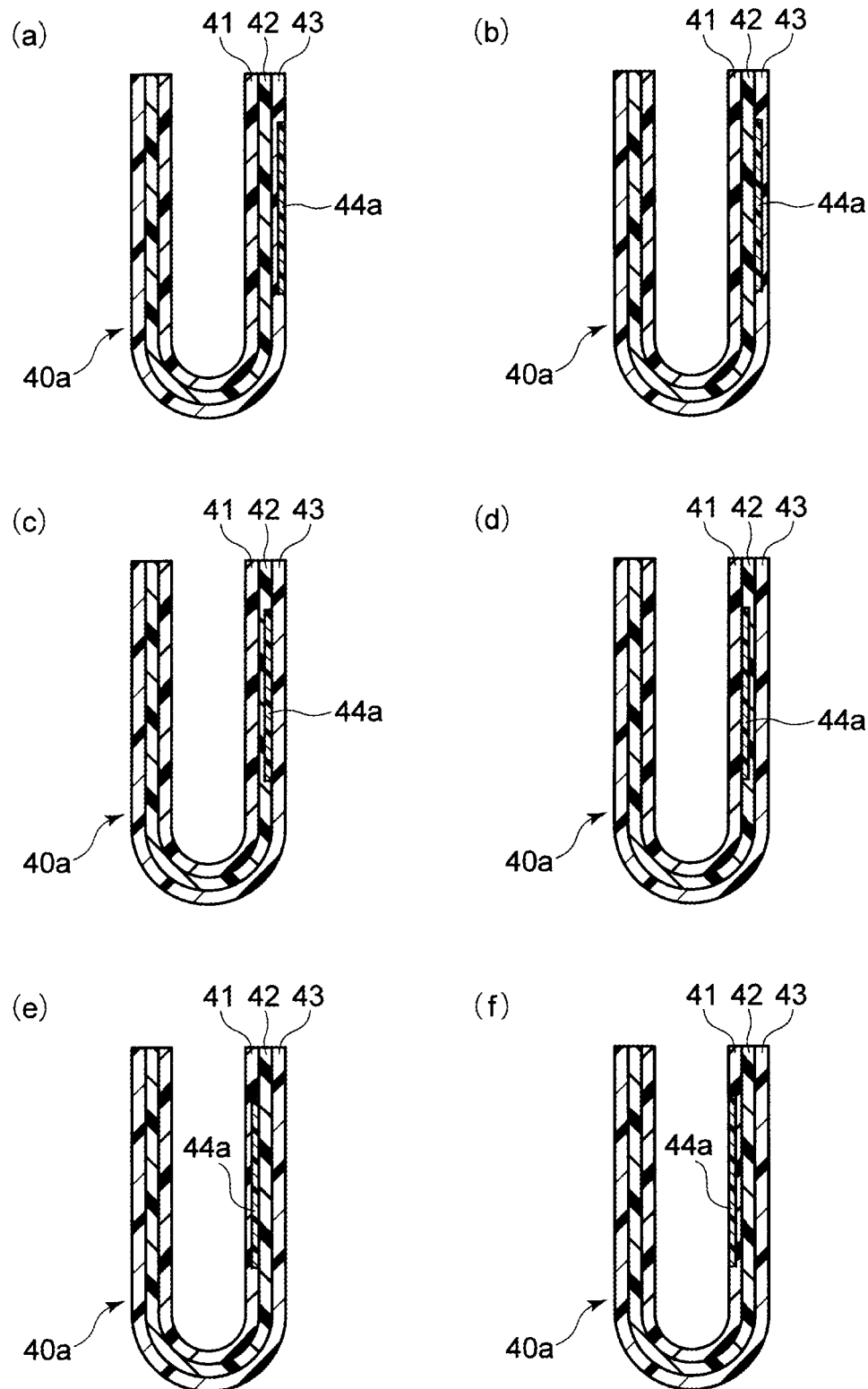
FIGS. 10(a) to 10(f) are cross-sectional views of various plastic members, each of which has a print made therein.
Figure 12:
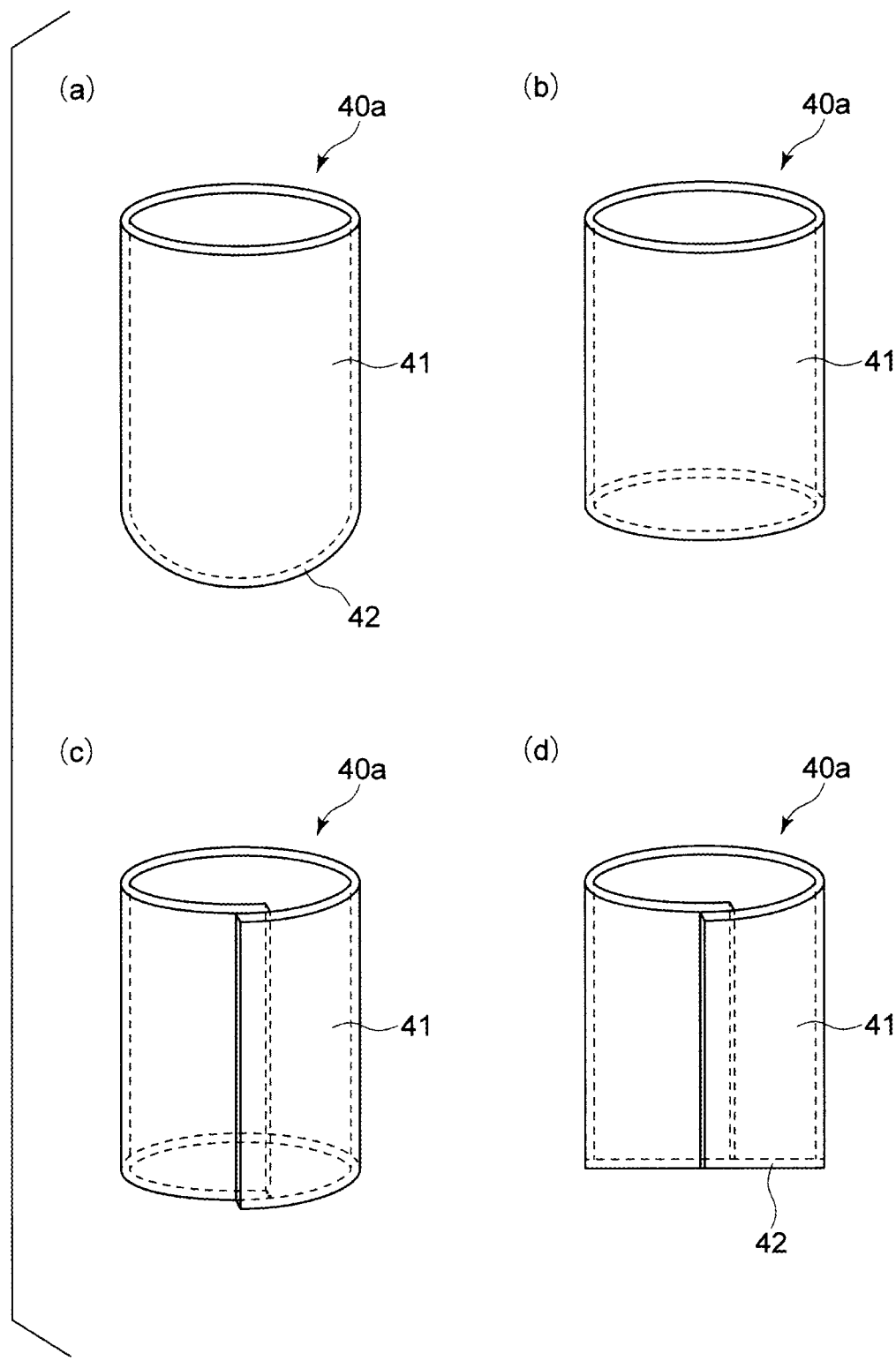
FIGS. 12(a) to 12(d) are perspective views illustrating various plastic members.

In one embodiment, a surface protection layer 80a may be provided on the plastic member 40a as illustrated in FIG. 9.

Preform 10a

The preform 10a includes a mouth part 11a, a trunk part 20a, which is linked to the mouth part 11a, and a bottom part 30a, which is linked to the trunk part 20a.

The mouth part 11a, which corresponds to the mouth part 11 of the above-described container body 10, is shaped substantially the same as the mouth part 11.

The trunk part 20a, which corresponds to the neck part 13, the shoulder part 12, and the trunk part 20 of the above-described container body 10, has a substantially cylindrical shape.

The bottom 30a, which corresponds to the bottom part of the above-described container body 10, has a substantially hemispherical shape.

Plastic Member 40a

The plastic member 40a is not adhered but attached on the outer surface of the preform 10a, being closely attached so as not to move or turn with respect to the preform 10a, or being closely attached to the extent that plastic member 40a does not fall under its own weight. The plastic member 40a is disposed over the entire region of the preform 10a in its circumferential direction so as to surround the preform 10a, having a circular horizontal cross section.

In this example, the plastic member 40a is disposed so as to cover the whole trunk part 20a excluding the neck part 13a, which corresponds to the neck part 13 of the container body 10, and to cover the whole bottom part 30a.

Note that the plastic member 40a may be disposed on the whole or part of the preform 10a excluding the mouth part 11a. For example, the plastic member 40a may be disposed so as to entirely cover the trunk part 20a and the bottom part 30a excluding the mouth part 11a. In addition, the number of disposed plastic members 40a may be two or more as well as one. For example, two plastic members 40a may be disposed on two different portions of the outside of the trunk part 20a.

Such plastic member 40a (40) may not have, or may have (may be a contractive tube), the function of contracting with respect to the preform 10a (container body 10). From the viewpoint of introducing little air between the container body 10 and the plastic member 40 after blow molding, i.e., bringing in close contact with each other, the plastic member 40a (40) preferably has the function of contracting (contractive tube) with respect to the preform 10a (the container body 10).

In the case of the former, the plastic member 40a may be, for example, a blow tube made by blow molding, a sheet-molded tube made by sheet molding such as deep drawing, an extruded tube made by extrusion molding, an inflation-molded tube into which a resin sheet obtained by the inflation process is shaped, and an injection-molded tube made by injection molding. However, these are examples only, and the plastic member 40a may be made by using some other molding method.

On the other hand, in the case where the plastic member (contractive tube) 40a has the function of contracting, the plastic member (contractive tube) 40a may contract (e.g., heat-contract) with respect to the preform 10a when, for example, an external effect (e.g., heat) is given. Alternatively, the plastic member (contractive tube) 40 may be contractive or elastic itself, being capable of contracting with no external effect given.

The plastic member 40a may be composed of a single layer or multiple layers.

Preferably, the plastic member 40a is formed of a plurality of layers: an inner layer 45, a middle layer 46, and an outer layer 47. These layers may be adhered to one another via an adhesion layer.

In one embodiment, the plastic member 40a includes a colored layer and/or a print layer having a region on which a print is made (a print region 44a).

The print region 44a may be formed on the outside or the inside of a layer included in the plastic member 40a.

For example, the print region 44a may be formed on the outside of the outer layer 43 (see FIG. 10(a)), or may be formed on its inside (see FIG. 10(b)).

The print region 44a may also be formed on the outside of the middle layer 42 (see FIG. 10(c)), or may be formed on its inside (see FIG. 10(d)).

The print region 44a may also be formed on the outside of the inner layer 41 (see FIG. 10(e)), or may be formed on its inside (see FIG. 10(f)).

For example, the following method can be used to make a print (form the print region 44a) on the plastic member 40a.

To make a print on the inside of the middle layer 46 as illustrated in FIG. 11, before stacking with the inner layer 45 and the outer layer 43, an inkjet nozzle 44 is inserted into the plastic resin tube forming the middle layer 42, a print is made by using the inkjet process (see FIG. 11(a)), and then the inner layer 41 and the middle layer 42 are stacked via an adhesion layer (see FIG. 11(b)).

Then, the outer layer 47 is added to the stack via an adhesion layer (see FIG. 11(c)), forming the plastic member 40a where a print is made on the inside of the middle layer 46 (FIG. 11(d)).

Examples of the adhesive include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive.

To make a print on the outside of the plastic member 40*a*, the print region 44*a* can be formed by direct printing with an inkjet printer.

In one embodiment, a printer for printing on the outside of the plastic member 40*a* attached on the preform 10*a* (composite preform 70) can be used. In one embodiment, the printer includes a head to which the composite preform is attached and which turns (rotates and revolves) the composite preform, an ink blowing unit which blows ink to the plastic member 40*a* attached to the head, and an ink curing unit which cures the attached ink. In this case, while the plastic member 40*a* in the composite preform 70 to which the head is attached is rotating and revolving, the ink blowing unit blows ink to the plastic member 40*a*. Then, the composite preform 70 is lifted in the head, and the ink curing unit cures the ink by, for example, UV curing. In this way, the print region 44*a* is disposed on the outside of the plastic member 40*a*.

In another embodiment, the printer includes a plurality of wheels that convey and turn (rotate and revolve) the composite preform 70. The plurality of wheels include an ink blowing wheel that blows ink and an ink curing wheel that cures the attached ink. In this case, while the individual ink blowing wheels sequentially convey the composite preform 70, an ink blowing unit on each ink blowing wheel blows ink onto the composite preform 70. Then, the composite preform 70 is conveyed to the ink curing wheel, which cures the ink by, for example, UV curing. In this way, the print region 44*a* is disposed on the outside of the plastic member 40*a*.

The print can also be made on the plastic member 40 included in the composite container 10A that has undergone blow molding.

For example, in one embodiment, the print can be made on the plastic member 40 by using a printer that includes a head to which the composite container 10A is attached and which turns (rotates and revolves) the composite container 10A, an ink blowing unit which blows ink to the plastic member 40 in the composite container 10A attached to the head, and an ink curing unit which cures the attached ink.

In this case, while the plastic member 40 in the composite container 10A to which the head is attached is rotating and revolving, the ink blowing unit blows ink to the plastic member 40. Then, the composite container 10A is lifted in the head, and the ink curing unit cures the ink by, for example, UV curing. In this way, the print is made on the outside of the plastic member 40.

In another embodiment, the printer includes a plurality of wheels that convey and turn (rotate and revolve) the composite container 10A. The plurality of wheels include an ink blowing wheel that blows ink that contains an ink composition having gas barrier properties and an ink curing wheel that cures the ink attached to the composite container 10A. In this case, while the individual ink blowing wheels sequentially convey the composite container 10A, an ink blowing unit on each ink blowing wheel blows ink that contains an ink composition having gas barrier properties onto the composite container 10A. Then, the composite container 10A is conveyed to the ink curing wheel, which cures the ink by, for example, UV curing. In this way, the print is made on the outside of the plastic member 40.

The ink used for forming the print region 44 (44*a*) is not limited to any specific ink, but preferably has gas barrier properties, i.e., gas-impermeable properties, which can improve gas barrier properties, such as oxygen barrier properties and water vapor barrier properties, of the composite container. More specifically, the following can be achieved: preventing oxygen from entering the container, preventing the liquid contents from degrading, preventing water vapor inside the container from evaporating into the outside, and preventing the contents from decreasing in amount.

The ink may contain a colorant of brown, black, green, white, red, or blue. The colorant may be a pigment or dye, but is preferably a pigment in view of lightfastness. Among the aforementioned colorants, a light reflective pigment such as titanium white, aluminum powder, mica powder, zinc sulfide, zinc oxide, calcium carbonate, kaolin, talc, or another white pigment, or a light absorbing pigment such as carbon black, ceramic black, bone black, or another colored pigment is preferred. Using the ink containing such pigment can reduce the transmittance of a visible light through the plastic member that has undergone blow molding, thereby preventing degradation of the liquid contents filling the composite container 10A. The content of a colorant in the ink is preferably 0.01 to 30% by mass, and more preferably 1 to 10% by mass.

Preferably, the ink contains a heat curable resin or an ionizing radiation curable resin, and more preferably, the ink contains an ionizing radiation curable resin because it provides higher surface hardness and excellent productivity. An ionizing radiation curable resin may be used in conjunction with a heat curable resin.

As the ionizing radiation curable resin, a resin that can cause a polymerization and cross-linking reaction when irradiated with ionizing radiation, such as an ultraviolet or electron ray, may be used. Examples of such resins include polyester resins, polyether resins, acrylic resins, epoxy resins, polyurethane resins, alkyd resins, spiroacetal resins, polybutadiene resins, polythiol-polyene resins, and polyhydric alcohols.

Among others, ultraviolet curable resins are preferred because they have higher following capability and are less likely to have cracks and other defects caused by blow molding.

Examples of ultraviolet curable resins may include ethyl (meth)acrylate, ethylhexyl(meth)acrylate, styrene, methylstyrene, and N-vinylpyrrolidone, each of which has one unsaturated bond; polymethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth) acrylate, each of which has two or more unsaturated bonds; and a reaction product of any of the foregoing compounds with (meth)acrylate or the like.

The term "(meth)acrylate", as used herein, refers to methacrylate and acrylate. It is further preferable to use any of these resins in conjunction with a photopolymerization initiator, such as acetophenones, benzophenones, or benzyls.

Examples of heat curable resins include phenolic resins, urea resins, diallyl phthalate resins, melamine resins, guanamine resins, unsaturated polyester resins, polyurethane resins, epoxy resins, aminoalkyd resins, melamine-urea co-condensed resins, silicone resins, and polysiloxane resins. It is further preferable to use any of these resins in conjunction with a thermal polymerization initiator, a hardening accelerator, a hardener, or the like.

The total content of heat curable resins and ionizing radiation curable resins in the ink is preferably 1 to 20% by mass, and more preferably 1 to 10% by mass.

A print may be made more than once repeatedly. This can make the printed design and text remain clear even after the print layer 44*a* is expanded after blow molding.

It is preferable to give, before making a print, a surface treatment, such as corona treatment, low-temperature plasma treatment, or frame treatment, on the area where a print region 44a (44) will be formed on the plastic member 40a (40). Giving such surface treatment provides better wettability on the surface of a resin film or resin tube, thereby improving print quality. In addition to the surface of a resin film or resin tube, such treatment may be given to the surface of the plastic member 40a.

It is preferable to form an anchor coat layer in advance on the print region 44 (44a) in the plastic member 40 (40a). Providing an anchor coat layer improves the adhesion of ink to the plastic member 40 (40a). Thus, the need for a pre-treatment, such as corona treatment, is eliminated. Providing an anchor coat layer also helps to prevent blurred prints.

The anchor coat layer may be formed by using a conventionally known anchor coating agent. The anchor coat layer can be formed by, for example, using the inkjet process to apply a coating slip containing an anchor coating agent on the plastic member 40a (40), and then irradiating the slip with, for example, ionizing radiation to cure the slip.

In addition, it is preferable to form a surface protection layer 80a on the area where a print has been made on the plastic member 40a (40). Forming the surface protection layer 80a on the plastic member 40a (40) can effectively prevent defects to be caused over time in the print made on the plastic member 40a (40), and can also make the composite container more durable.

Preferably, the surface protection layer 80a contains a heat curable resin or an ionizing radiation curable resin, and more preferably, the surface protection layer 80a contains an ionizing radiation curable resin because it provides higher surface hardness and excellent productivity. An ionizing radiation curable resin may be used in conjunction with a heat curable resin. Any of the above-mentioned heat curable resins and ionizing radiation curable resins may be used. The surface protection layer 80a can be formed by, for example, using the inkjet process to apply a coating slip containing such a resin on a print part on the surface of the plastic member 40a (40), and then irradiating the slip with, for example, ionizing radiation to cure the slip.

The following describes shapes of the plastic member 40a.

As illustrated in FIG. 12(a), the plastic member 40a may be in a bottom-closed cylindrical shape as a whole, having a cylindrical trunk part 41 and a bottom part 42 linked to the trunk part 41.

In this case, the plastic member 40a, with its bottom part 42 covering the bottom part 30a of the preform 10a, can give various functions and characteristics not only to the trunk part 20 of the composite container 10A but also to the bottom part 30. Examples of such plastic member 40a may include the above-described blow tube and sheet-molded tube.

As illustrated in FIG. 12(b), the plastic member 40a may also be in a circular tube (bottom-open cylindrical) shape as a whole, having a cylindrical trunk part 41. In this case, the above-described blow tube, extruded tube, inflation-molded tube, or sheet-molded tube, for example, may be used as the plastic member 40a.

As illustrated in FIGS. 12(c) and 12(d), the plastic member 40a may also be made by sticking together both ends of a film formed in a cylindrical shape. In this case, the plastic member 40a may be formed in a tubular (bottom-open cylindrical) shape having the trunk part 41 as illustrated in FIG. 12(c), or may be formed in a bottom-closed cylindrical shape by sticking together the bottom part 42 as illustrated in FIG. 12(d). In this case, a blow tube, an extruded tube, an inflation-molded tube, or a sheet-formed tube, for example, may be used as the plastic member 40a.

The following describes methods for producing the plastic member 40a.

In one embodiment, the plastic member 40a can be produced by molding a resin material with, if desired, a colorant into a resin sheet.

Examples of the molding method include deep-drawing molding or forming a resin sheet into a tube and then welding or sticking together both ends of the sheet.

The plastic member 40a formed of multiple layers can be obtained by stacking two or more resin sheets via any of the aforementioned adhesives to form a laminated resin sheet.

Examples of the adhesive to be used include a polyvinyl acetate-based adhesive, a polyacrylic ester-based adhesive, a cyanoacrylate-based adhesive, an ethylene copolymer adhesive, a cellulose-based adhesive, a polyester-based adhesive, a polyamide-based adhesive, a polyimide-based adhesive, an amino resin-based adhesive, a phenolic resin-based adhesive, an epoxy-based adhesive, a polyurethane-based adhesive, a rubber-based adhesive, and a silicone-based adhesive. The adhesive can be applied by using, for example, a coating method such as the roll coating method, the gravure roll coating method, or the kiss coating method, or a printing method.

To obtain any of the aforementioned resin sheets, a commercially available product may be used, or such a resin sheet may be produced by using a conventionally known method. In the present invention, it is preferable to produce the resin sheet by extrusion molding, which is preferably performed by the T-die method or the inflation method.

In one embodiment, the plastic member 40a can be produced by extruding a mixture of a heated and melted resin material and others including, if desired, a colorant into a tubular shape.

In this case, the plastic member 40a composed of multiple layers can be obtained by co-extruding two or more different resin materials. The plastic member 40a can also be obtained by extruding the aforementioned mixture within a die and then performing blow molding so that the diameter of the mixture is extended to match the inner surface of the die.

The plastic member 40a that is contractive can be obtained by taking the following steps.

First, close one end of the tube, which is obtained by extruding a mixture containing any of the aforementioned resin materials, by means of, for example, adhesion or welding. Insert the tube with its one end closed into a die having a larger inner diameter than the outer diameter of the tube, and then place a blowing apparatus at the other end of the tube. In this step, it is preferable to bring the blowing apparatus in close contact with the tube so that no air is allowed to leak from the tube and from a gap between them.

Next, put the tube, the die, and the blowing apparatus in this arrangement into a heating furnace, and then heat them to 70 to 150° C. in the furnace. To keep a uniform temperature inside, a hot-air circulating furnace may be used as the heating furnace. Alternatively, the tube, the die, and the blowing apparatus may be heated by passing them through a heated liquid. Next, remove the tube, the die, and the blowing apparatus from the heating furnace, and then pressurize and expand the inner surface of the tube by blowing air from the blowing apparatus into the tube. This causes the tube to expand, with its diameter extending to match the inner shape of the die. After that, while leaving the blowing apparatus blowing air, cool the tube in cold water, and then remove the tube from the die. Cutting the tube into a desired size produces a contractive plastic member 40a.

In one embodiment, the plastic member 40a can also be obtained by injection molding. Specific steps are as follows. First, heat and melt a resin material. Then, inject the heated and melted resin material into a die. Cool the material and remove it from the die. The plastic member 40a can be obtained in this way.

Method for Producing Composite Container 10A

A method for producing (blow molding) the composite container 10A according to the present embodiment will now be described with reference to FIGS. 13(a) to 13(f).

First, a preform 10a made of a plastic material is prepared (see FIG. 13(a)). For this purpose, the preform 10a may be made by, for example, injection molding with an injection molding machine (not illustrated). Alternatively, a preform conventionally used in common may be used as the preform 10a.

Next, a plastic member 40a is disposed on the outside of the preform 10a to make a composite preform 70, which includes the preform 10a and the plastic member 40a brought in close contact with the outside of the preform 10a (see FIG. 13(b)).

In this example, the plastic member 40a is in a bottom-closed cylindrical shape as a whole, having a cylindrical trunk part 41 and a bottom part 42 linked to the trunk part 41. The plastic member 40a is attached so as to cover the whole trunk part 20a excluding the part corresponding to the neck part 13 of the container body 10 and to cover the whole bottom part 30a.

In this case, the plastic member 40a, which has an inner diameter equal to or slightly smaller than the outer diameter of the preform 10a, may be brought in close contact with the outer surface of the preform 10a by pressing the plastic member 40a into the preform 10a.

Alternatively, as described later, the plastic member 40a that is heat-contractive may be disposed on the outer surface of the preform 10a and then heated to 50° C. to 100° C. to cause the plastic member to heat-contract, thereby bringing the plastic member 40a in close contact with the outer surface of the preform 10a.

In this way, the composite preform 70 is made in advance by bringing the plastic member 40a in close contact with the outside of the preform 10a. Thus, it is made possible to carry out the series of processes for making the composite preform 70 (FIGS. 13(a) and 13(b)) in a place (e.g., factory) different from the place (e.g., factory) where the series of processes for making the composite container 10A by means of blow moldering (FIGS. 13(c) to 13(f)) is carried out.

Next, the composite preform 70 is heated by a heating apparats 51 (see FIG. 13(c)). In this step, the composite preform 70, while turning with the mouth part 11a facing downward, is heated uniformly by the heating apparatus 51 in the circumferential direction. The heating temperature for the preform 10a and the plastic member 40a in this heating process may be set to 90° C. to 130° C., for example.

Subsequently, the composite preform 70, which has been heated by the heating apparatus 51, is fed to a blow molding die 50 (see FIG. 13(d)).

The blow molding die 50 is used to form the composite container 10A. In this example, the blow molding die 50 is composed of a pair of trunk part dies 50a and 50b separated from each other and a bottom part die 50c (see FIG. 13(d)). With reference to FIG. 13(d), the pair of trunk part dies 50a and 50b are away from each other, while the bottom part die 50c is lifted upward. Then, the composite preform 70 is inserted between such pair of trunk part dies 50a and 50b.

Next, as illustrated in FIG. 13(e), the bottom part die 50c descends and the pair of trunk part dies 50a and 50b are closed, forming the blow molding die 50 sealed with the pair of trunk part dies 50a and 50b and the bottom part die 50c. Then, air is injected into the preform 10a, followed by biaxial stretch blow molding performed on the composite preform 70.

Thus, the container body 10 is obtained from the preform 10a in the blow molding die 50. Meanwhile, the trunk part dies 50a and 50b are heated up to 30° C. to 80° C. and the bottom part die 50c is cooled down to 5° C. to 25° C. In this step, the preform 10a and the plastic member 40a of the composite preform 70 are integrally inflated in the blow molding die 50. Consequently, the preform 10a and the plastic member 40a are integrally formed into a shape corresponding to the inner surface of the blow molding die 50.

In this way, the composite container 10A including the container body 10 and the plastic member 40 disposed on the outer surface of the container body 10 is obtained.

Then, as illustrated in FIG. 13(f), the pair of trunk part dies 50a and 50b and the bottom part die 50c are separated from one another, and the composite container 10A is removed from the blow molding die 50.

Variation of Method for Producing Composite Container 10A

A variation of the blow molding method (method for producing the composite container 10A) according to the present embodiment will now be described with reference FIGS. 14(a) to 14(f).

The variation illustrated in FIGS. 14(a) to 14(f) represents that the plastic member (contractive tube) 40a has the function of contracting with respect to the preform 10a. The configuration in other respects is substantially the same as that of the embodiment illustrated in FIGS. 13(a) to 13(f). Elements in FIGS. 14(a) to 14(f) identical to those in FIGS. 13(a) to 13(f) are given the identical reference signs and detailed descriptions thereof are omitted.

First, a preform 10a made of a plastic material is prepared (see FIG. 14(a)).

Next, the plastic member (contractive tube) 40a, which is composed of a plurality of layers and at least one of the layers is a colored layer, is disposed on the outside of the preform 10a (see FIG. 14(b)).

In this example, the plastic member (contractive tube) 40a is in a bottom-closed cylindrical shape as a whole, having a cylindrical trunk part 41 and a bottom part 42 linked to the trunk part 41. The plastic member (contractive tube) 40 is attached so as to cover the whole trunk part 20a excluding the part corresponding to the neck part 13 of the container body 10 and to cover the whole bottom part 30a.

Subsequently, the preform 10a and the plastic member (contractive tube) 40a are heated by the heating apparatus 51 (see FIG. 14(c)).

In this step, the preform 10a and the plastic member (contractive tube) 40a, while turning with the mouth part 11a facing downward, are heated by the heating apparatus 51 uniformly in the circumferential direction. The heating temperature for the preform 10a and the plastic member (contractive tube) 40a in this heating process may be set to 90° C. to 130° C., for example.

Figure 14:
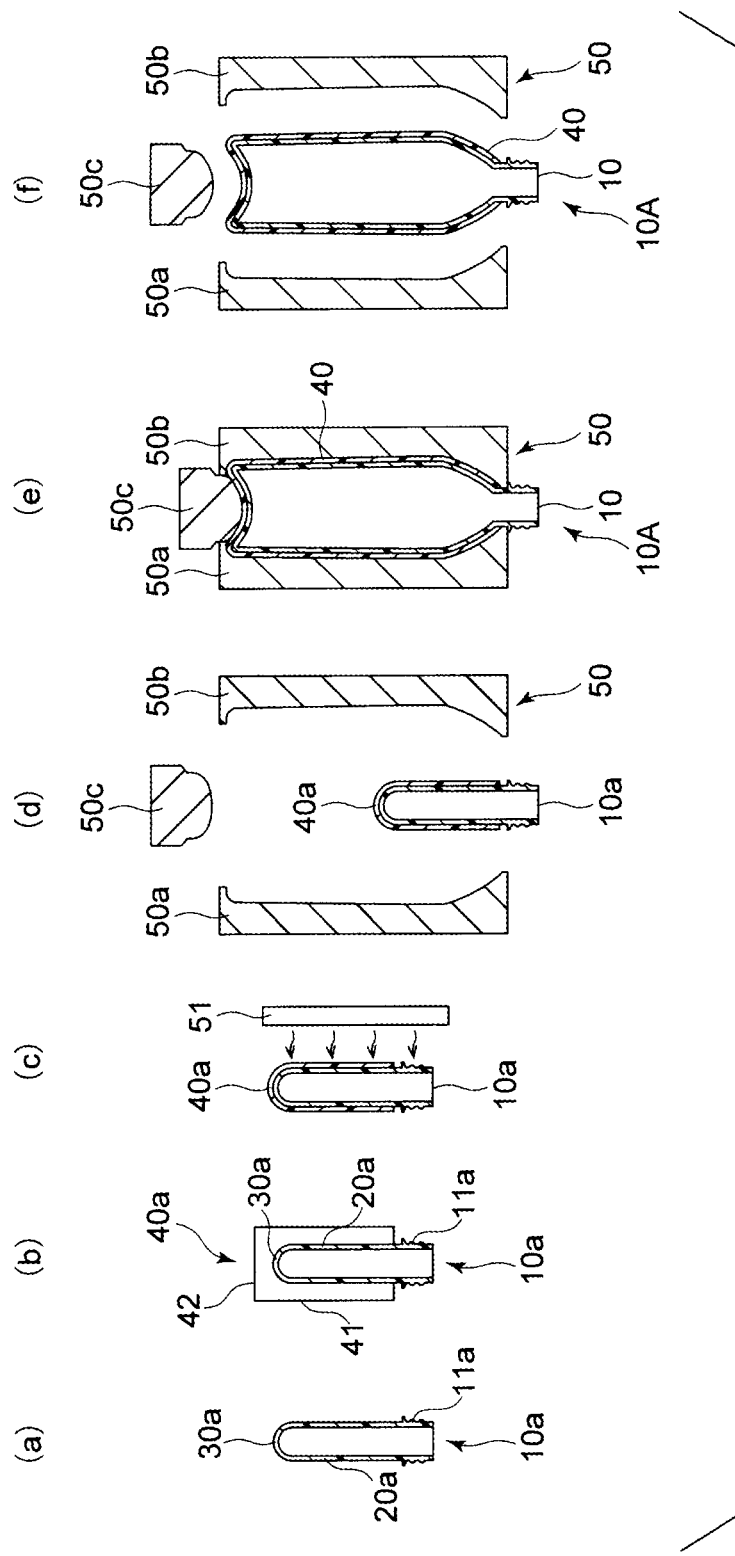
FIGS. 14(a) to 14(f) are schematic diagrams illustrating a method for producing a composite container according to one embodiment of the present invention.

In this way, the plastic member (contractive tube) 40*a* is heated to contract (heat-shrunk), resulting in closely contacting with the outside of the preform 10*a* (see FIG. 14(*c*)).

In the case where the plastic member (contractive tube) 40*a* is contractive itself, the plastic member (contractive tube) 40*a* may be in close contact with the outside of the preform 10*a* immediately when disposed on the outside of the preform 10*a* (see FIG. 14(*b*)).

Subsequently, the preform 10*a* and the plastic member (contractive tube) 40*a*, which have been heated by the heating apparatus 51, are fed to the blow molding die 50 (see FIG. 14(*d*)).

Figure 13:
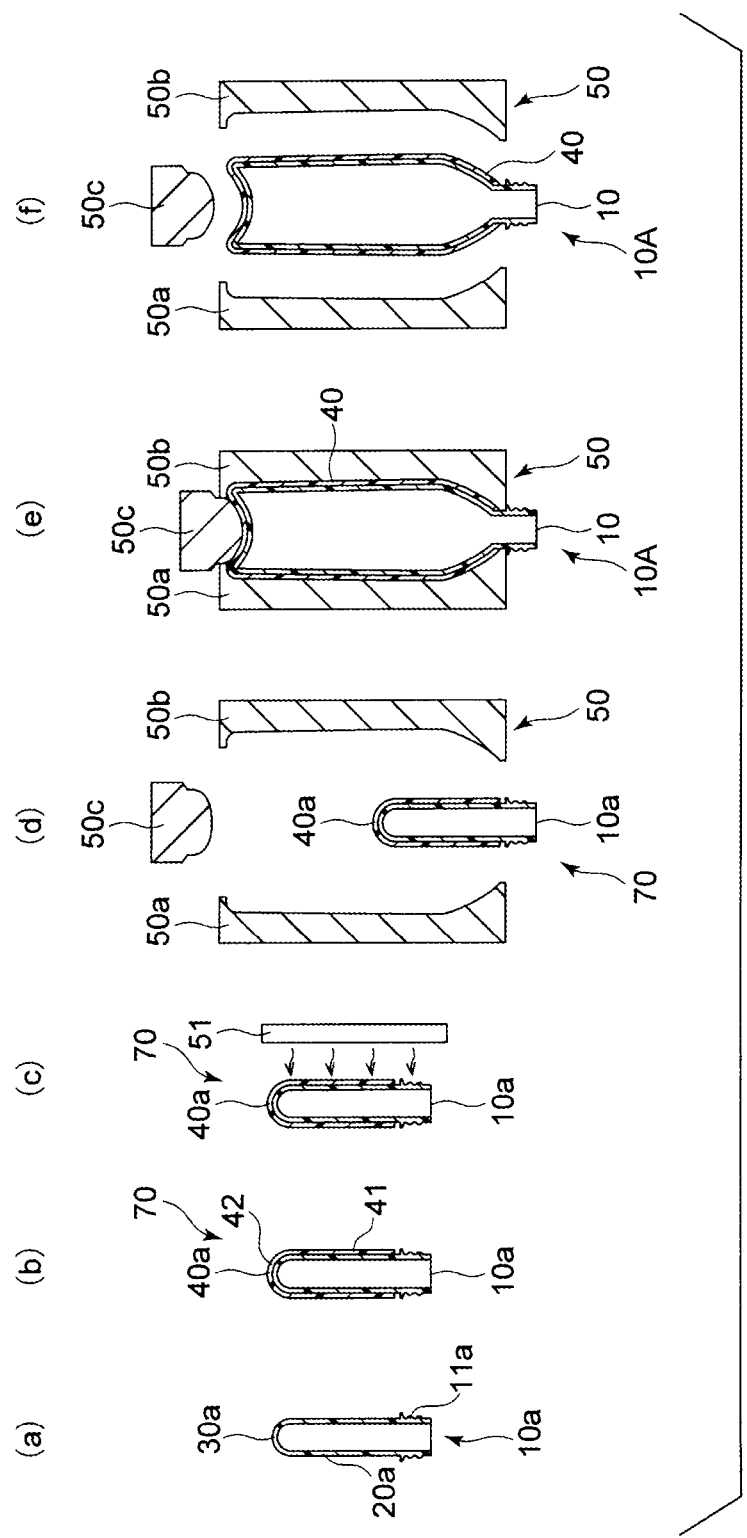
FIGS. 13(a) to 13(f) are schematic diagrams illustrating a method for producing a composite container according to one embodiment of the present invention.

The blow molding die 50 is used to mold the preform 10*a* and the plastic member (contractive tube) 40*a*, producing the composite container 10A, which includes the container body 10 and the plastic member (contractive tube) 40 disposed on the outer surface of the container body 10 in a way substantially similar to that illustrated in FIGS. 13(*a*) to 13(*f*) (see FIGS. 14(*d*) to 14(*f*)).

Another Variation of Method for Producing Composite Container 10A

Another variation of the method (the blow molding method) for producing the composite container 10A according to the present embodiment will now be described with reference to FIGS. 15(*a*) to 15(*g*).

Figure 15:
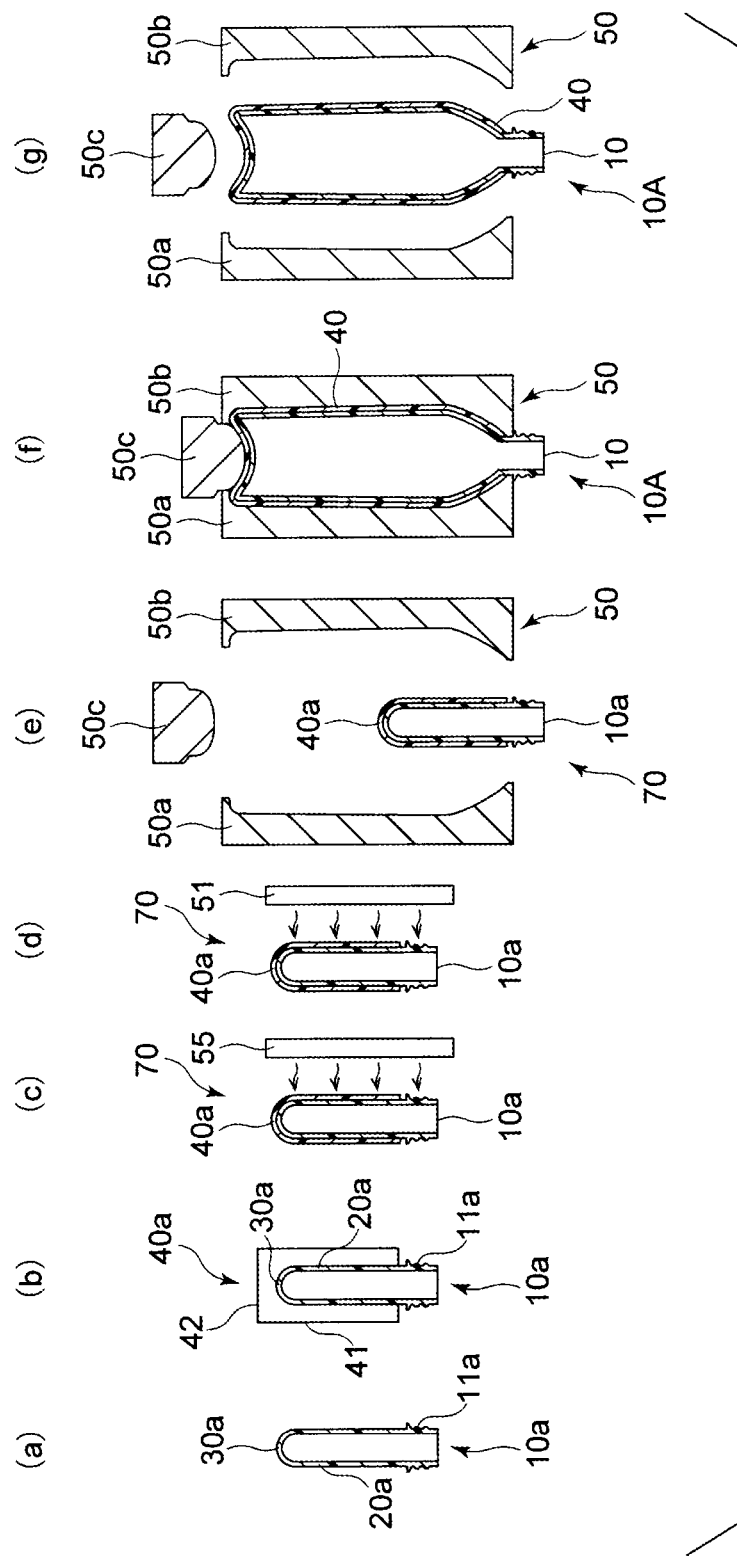
FIGS. 15(a) to 15(g) are schematic diagrams illustrating a method for producing a composite container according to one embodiment of the present invention.

The variation illustrated in FIGS. 15(*a*) to 15(*g*) represents that the plastic member 40*a* has the function of contracting with respect to the preform 10*a*, and the preform 10*a* and the plastic member (contractive tube) 40*a* are heated in two steps. The configuration in other respects is substantially the same as that of the embodiment illustrated in FIGS. 13(*a*) to 13(*f*). Elements in FIGS. 15(*a*) to 15(*g*) identical to those in FIGS. 13(*a*) to 13(*f*) are given the identical reference signs and detailed descriptions thereof are omitted.

First, a preform 10*a* made of a plastic material is prepared (see FIG. 15(*a*)).

Next, the plastic member (contractive tube) 40*a* is disposed on the outside of the preform 10*a* (see FIG. 15(*b*)). In this example, the plastic member (contractive tube) 40*a* is in a bottom-closed cylindrical shape as a whole, having a cylindrical trunk part 41 and a bottom part 42 linked to the trunk part 41. The plastic member (contractive tube) 40 is attached so as to cover the whole trunk part 20*a* excluding the part corresponding to the neck part 13 of the container body 10 and to cover the whole bottom part 30*a*.

Subsequently, the preform 10*a* and the plastic member (contractive tube) 40*a* are heated by a first heating apparatus 55 (see FIG. 15(*c*)). The heating temperature for the preform 10*a* and the plastic member (contractive tube) 40*a* in this step may be set to 50° C. to 100° C., for example.

The plastic member (contractive tube) 40*a* is heated to contract (heat-shrunk), resulting in closely contacting with the outside of the preform 10*a*. Consequently, the composite preform 70 including the preform 10*a* and the plastic member (contractive tube) 40*a* brought in close contact with the outside of the preform 10*a* is obtained (see FIG. 15(*c*)).

In this way, the composite preform 70 is made in advance by using the first heating apparatus 55 to heat the plastic member (contractive tube) 40*a* bringing it in close contact with the outside of the preform 10*a*. Thus, it is made possible to carry out the series of processes for making the composite preform 70 (FIGS. 15(*a*) to 15(*c*)) in a place (e.g., factory) different from the place (e.g., factory) where the series of processes for making the composite container 10A by means of blow moldering (FIGS. 15(*d*) to 15(*g*)) is carried out.

Next, the composite preform 70 is heated by a second heating apparatus 51 (see FIG. 15(*d*)). In this step, the composite preform 70, while turning with the mouth part 11*a* facing downward, is heated by the second heating apparatus 51 uniformly in the circumferential direction. The heating temperature for the preform 10*a* and the plastic member (contractive tube) 40*a* in this heating process may be set to 90° C. to 130° C., for example.

Subsequently, the composite preform 70, which has been heated by the second heating apparatus 51, is fed to the blow molding die 50 (see FIG. 15(*e*)).

The blow molding die 50 is used to mold the composite preform 70, producing the composite container 10A, which includes the container body 10 and the contractive tube (contractive tube) 40 disposed on the outer surface of the container body 10, in a way substantially similar to the that illustrated in FIGS. 13(*a*) to 13(*f*) (see FIGS. 15(*e*) to 15(*g*)).

As described above, according to the present embodiment, the composite container 10A, which includes the container body 10 and the plastic member 40, is made by integrally inflating the preform 10*a* and plastic member 40*a* of the composite preform 70 through the blow molding performed on the composite preform 70 in the blow molding die 50. Accordingly, the preform 10*a* (container body 10) and the plastic member 40*a* (plastic member 40) can be formed of different members. Therefore, various functions and characteristics can be given to the composite container 10A in a flexible manner by selecting an appropriate type and shape of the plastic member 40.

Furthermore, the present embodiment eliminates the need for preparing a new molding apparatus for making the composite container 10A, because the composite container 10A can be made by using general blow molding equipment with no changes added.

Variation of First Embodiment

A variation of the first embodiment of the present invention will now be described with reference to FIGS. 16, 17, and 18(*a*) to 18(*f*).

Figure 16:
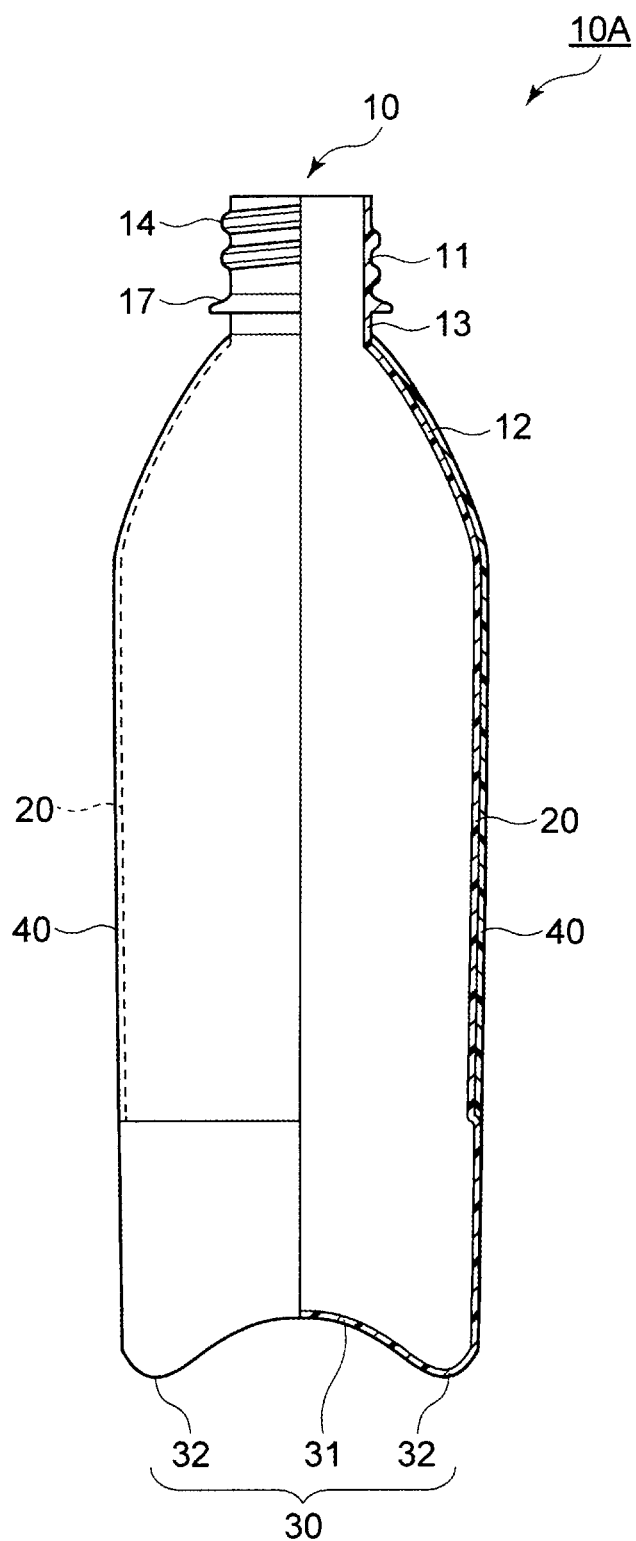
FIG. 16 is a partial vertical cross-sectional view illustrating a composite container according to one embodiment of the present invention.
Figure 17:
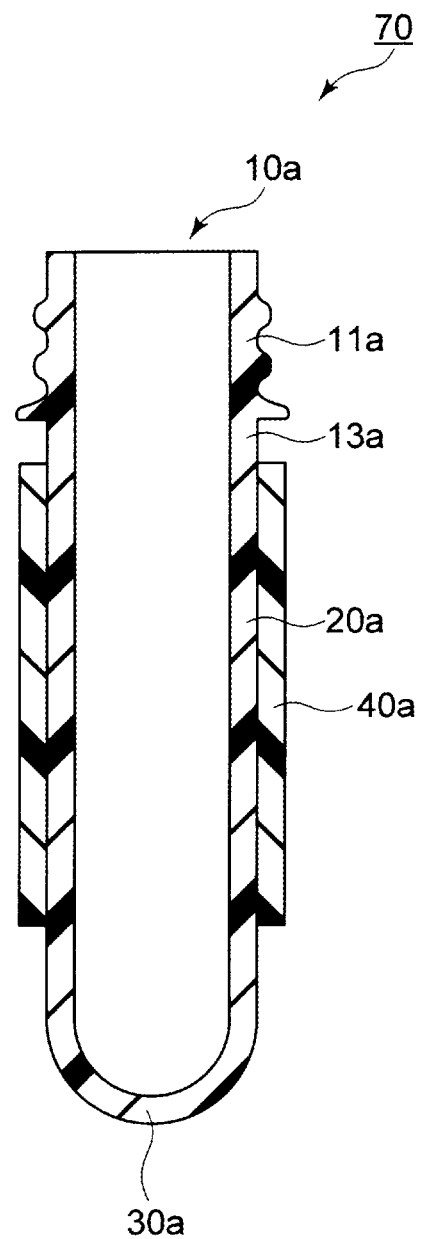
FIG. 17 is a vertical cross-sectional view illustrating a composite preform according to one embodiment of the present invention.
Figure 18:
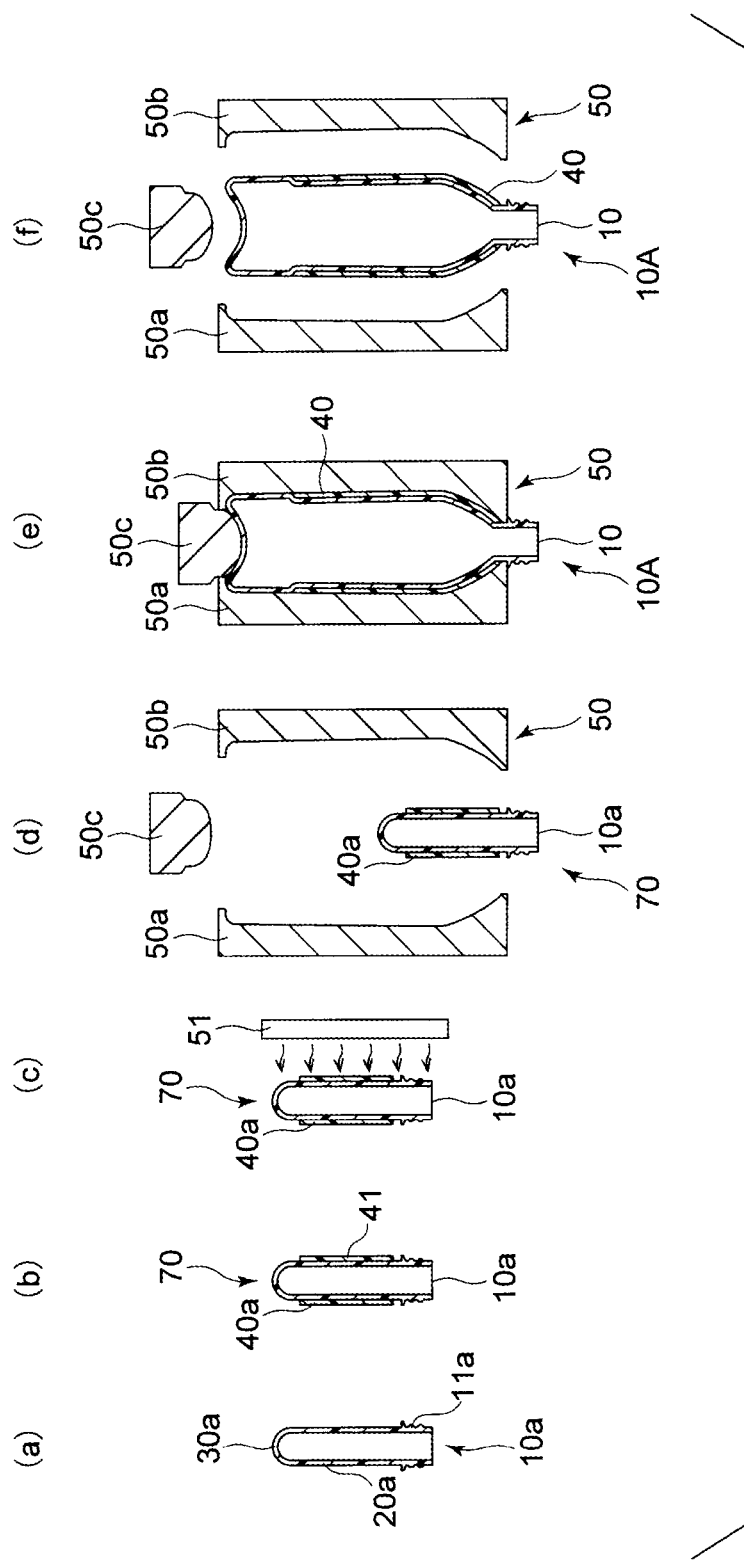
FIGS. 18(a) to 18(f) are schematic diagrams illustrating a method for producing a composite container according to one embodiment of the present invention.

According to the variation illustrated in FIGS. 16, 17, and 18(*a*) to 18(*f*), a cylindrical plastic member 40*a* is used instead of the plastic member 40*a* having the trunk part and the bottom part.

In the composite container 10A illustrated in FIG. 16, the plastic member 40 extends from the shoulder part 12 to a lower part of the trunk part 20 of the container body 10, but does not reach the bottom part 30. Further, in the composite preform 70 illustrated in FIG. 17, the plastic member 40*a* is brought in close contact with the preform 10*a* to cover only the trunk part 20*a* of the preform 10*a*. More specifically, the plastic member 40*a* covers the trunk part 20*a* excluding its lower part and the part 13*a* corresponding to the neck part 13 of the container body 10.

The configuration in other respects in FIGS. 16, 17, and 18(*a*) to 18(*f*) is substantially the same as that of the embodiment illustrated in FIGS. 1 to 15. Elements in the variation illustrated in FIGS. 16, 17, and 18(*a*) to 18(*f*) identical to those in the embodiment illustrated in FIGS. 1 to 15 are given the identical reference signs and detailed descriptions thereof are omitted.

The configuration and production method of the composite container 10A and the configuration and production method of the composite preform 70 are substantially similar to those of the embodiment illustrated in FIGS. 1 to 15, and thus detailed descriptions thereof are omitted. With reference to FIGS. 16, 17, and 18(*a*) to 18(*f*), the plastic member 40*a* having the function of contracting with respect to the preform 10*a* may be used.

Second Embodiment

A second embodiment of the present invention will now be described with reference to the drawings. FIGS. 19 to 28 illustrate the second embodiment of the present invention. Elements in FIGS. 19 to 28 identical to those in the first embodiment are given the identical reference signs and detailed descriptions thereof are omitted.

Composite Container 10A

Figure 19:
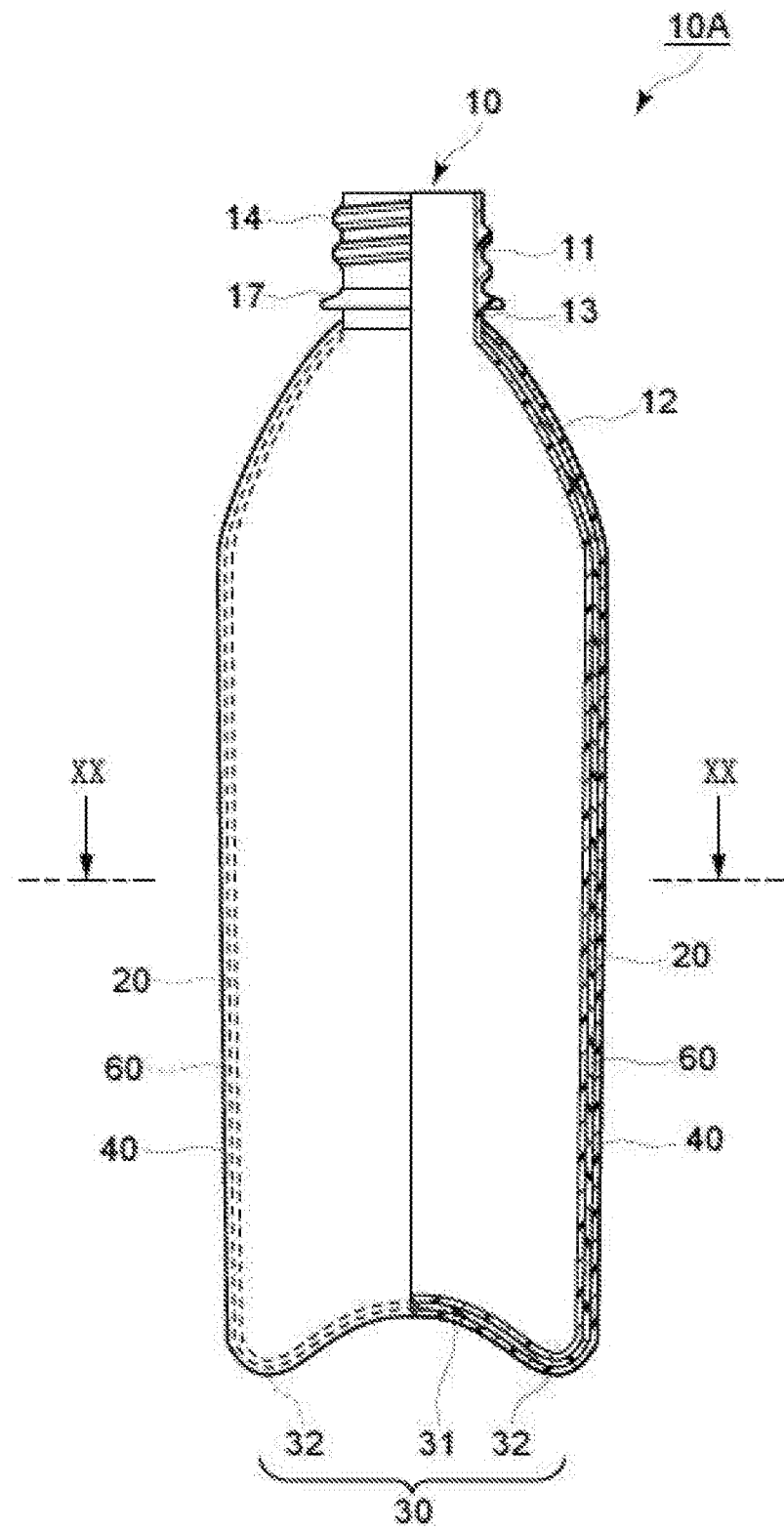
FIG. 19 is a partial vertical cross-sectional view illustrating a composite container according to one embodiment of the present invention.
Figure 20:
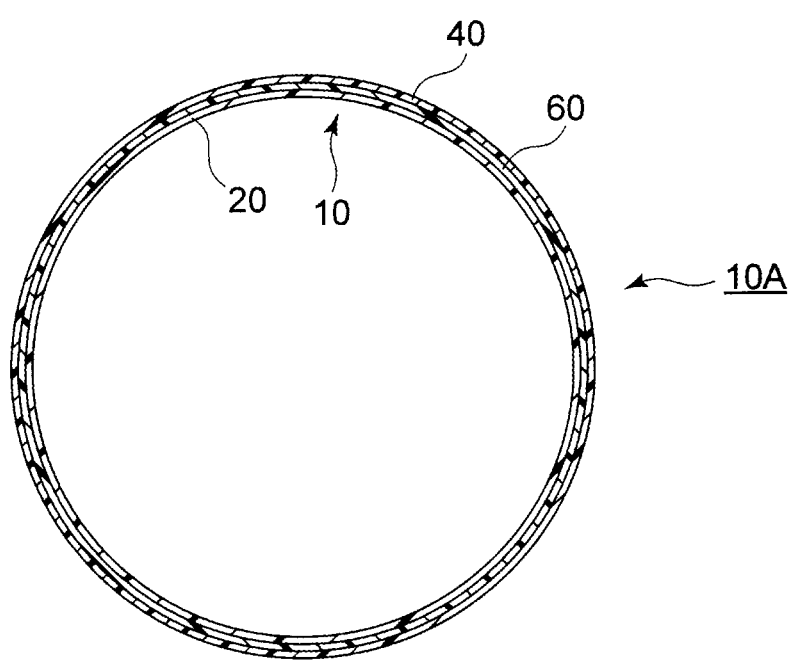
FIG. 20 is a horizontal cross-sectional view illustrating a composite container according to a second embodiment of the present invention (taken along the line XX-XX in FIG. 19).

First, an overview of a composite container made by using a blow molding method according to the present embodiment is provided with reference to FIGS. 19 and 20.

As described later, the composite container 10A illustrated in FIGS. 19 and 20 is obtained by integrally inflating a preform 10*a*, an inner label member 60*a*, and a plastic member 40*a* of a composite preform 70 through biaxial stretch blow molding performed on the composite preform 70, which includes the preform 10*a*, the inner label member 60*a*, and the plastic member 40*a* (see FIG. 21), by using a blow molding die 50.

Such composite container 10A includes a container body 10, which is made of a plastic material and located inside the container, an inner label member 60, which is disposed in close contact with the outside of the container body 10, and a plastic member 40, which is disposed in close contact with the outer surface of the inner label member 60.

Container Body 10

On one hand, the container body 10 includes a mouth part 11, a neck part 13 disposed below the mouth part 11, a shoulder part 12 disposed below the neck part 13, a trunk part 20 disposed below the shoulder part 12, and a bottom part 30 disposed below the trunk part 20.

On the other hand, the inner label member 60 is thinly stretched and brought in close contact with the outer surface of the container body 10 so as not to easily move or turn with respect to the container body 10.

The plastic member 40 is thinly stretched and brought in close contact with the outer surfaces of the container body 10 and inner label member 60 so as not to easily move or turn with respect to the container body 10.

At least part of the plastic member 40 may possibly be translucent or transparent. In this case, the inner label member 60 is visible from outside through the translucent or transparent part. Note that the plastic member 40 may be entirely translucent or transparent, or may include an opaque portion and a translucent or translucent portion (e.g., a window part). The present embodiment is described on the assumption that the plastic member 40 is entirely transparent.

Inner Label Member 60

The following describes the inner label member 60. The inner label member 60 is obtained by disposing it so as to surround the outside of the preform 10*a*, and performing biaxial stretch blow molding integrally on the preform 10*a* and the inner label member 60*a*.

The inner label member 60 is not adhered but attached on the outer surface of the container body 10, being closely attached so as not to move or turn with respect to the container body 10. The inner label member 60 is thinly stretched on the outer surface of the container body 10 to cover the container body 10. As illustrated in FIG. 19, the inner label member 60 is disposed over the entire region of the container body 10 in its circumferential direction so as to surround the container body 10, having a substantially circular horizontal cross section.

In this example, the inner label member 60 is disposed so as to cover the shoulder part 12, the trunk part 20, and the bottom part 30 of the container body 10, excluding the mouth part 11 and the neck part 13. This enables desired letters, images, or the like to be added to the shoulder part 12, the trunk part 20, and the bottom part 30 of the container body 10, thereby giving decorativeness to the composite container 10A and displaying information thereon.

The inner label member 60 may be disposed on the whole or part of the container body 10 excluding the mouth part 11. For example, the inner label member 60 may be disposed so as to entirely cover the neck part 13, the shoulder part 12, the trunk part 20, and the bottom part 30 of the container body 10 excluding the mouth part 11. In addition, the number of inner label members 60 may be two or more as well as one. The inner label member 60 may either be formed in the same region as the plastic member 40 or in a region smaller than the plastic member 40. In the latter case, it is preferable that the inner label member 60 is entirely covered by the plastic member 40.

An example of the thickness of the inner label member 60 attached on the container body 10 may be, without limitation, approximately 5 μm to 50 μm.

Plastic Member 40

The following describes the Plastic member 40. The plastic member 40 is obtained by disposing the plastic member 40*a* so as to surround the outside of the inner label member 60*a*, and performing biaxial stretch blow molding integrally on the preform 10*a*, the inner label member 60*a*, and the plastic member 40*a*.

The plastic member 40 is not adhered but attached on the outer surface of the inner label member 60, being closely attached so as not to move or turn with respect to the container body 10. The plastic member 40 is thinly stretched on the outer surface of the inner label member 60 to cover the inner label member 60. As illustrated in FIG. 20, the plastic member 40 is disposed over the entire region of the container body 10 in its circumferential direction so as to surround the container body 10, having a substantially circular horizontal cross section.

The configurations of the container body 10 and the plastic member 40 in other respects are substantially similar to those in the above-described first embodiment, and thus detailed descriptions thereof are omitted.

Composite Preform 70

A configuration of the composite preform 70 according to the present embodiment will now be described with reference to FIG. 21.

Figure 21:
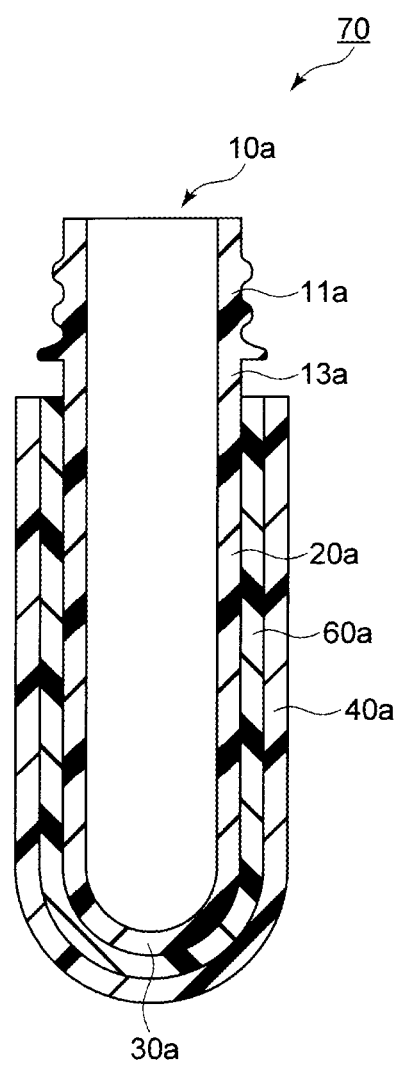
FIG. 21 is a vertical cross-sectional view illustrating a composite preform according to one embodiment of the present invention.
Figure 22:
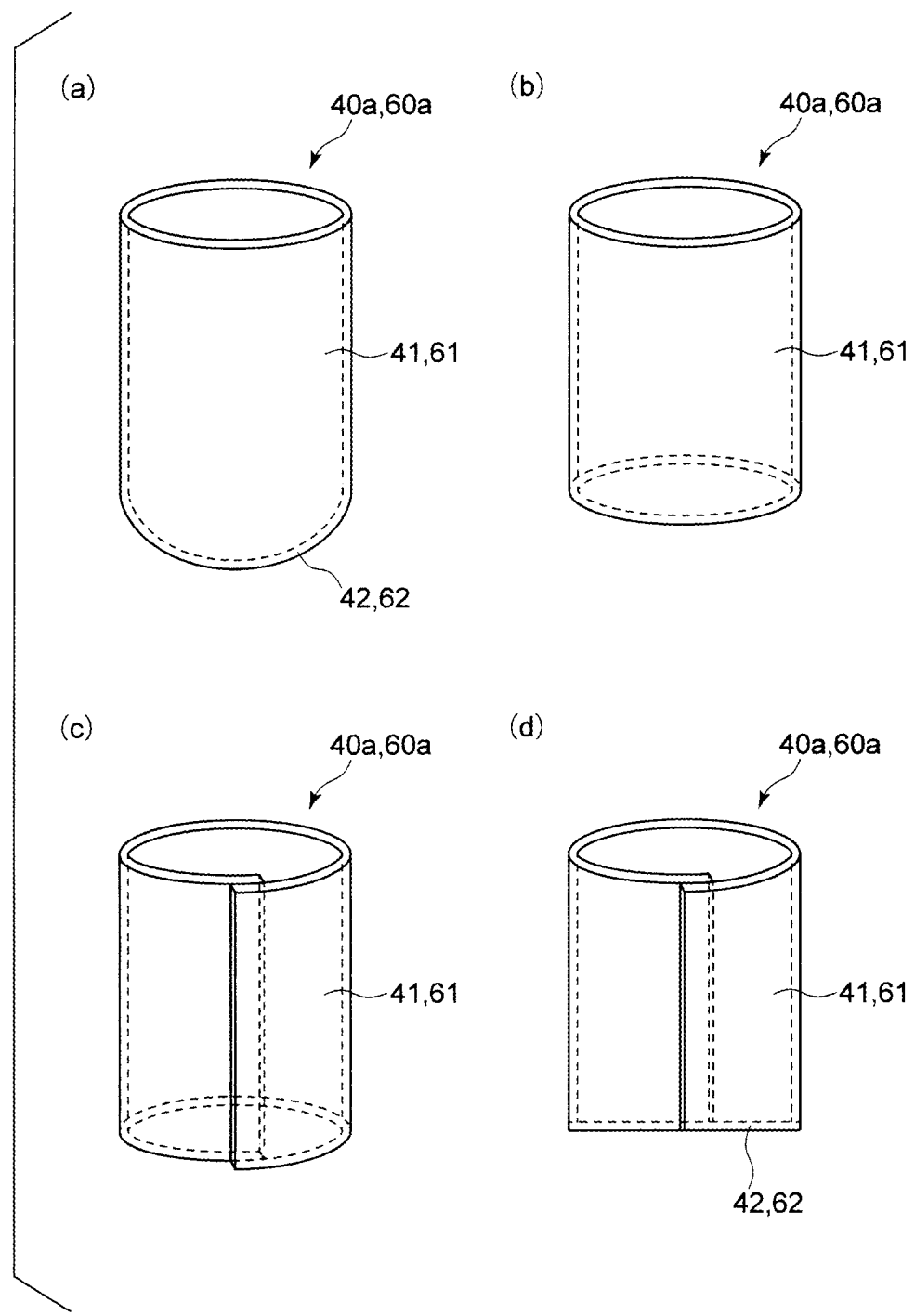
FIGS. 22(a) to 22(d) are perspective views illustrating various inner label members and various plastic members.
Figure 23:
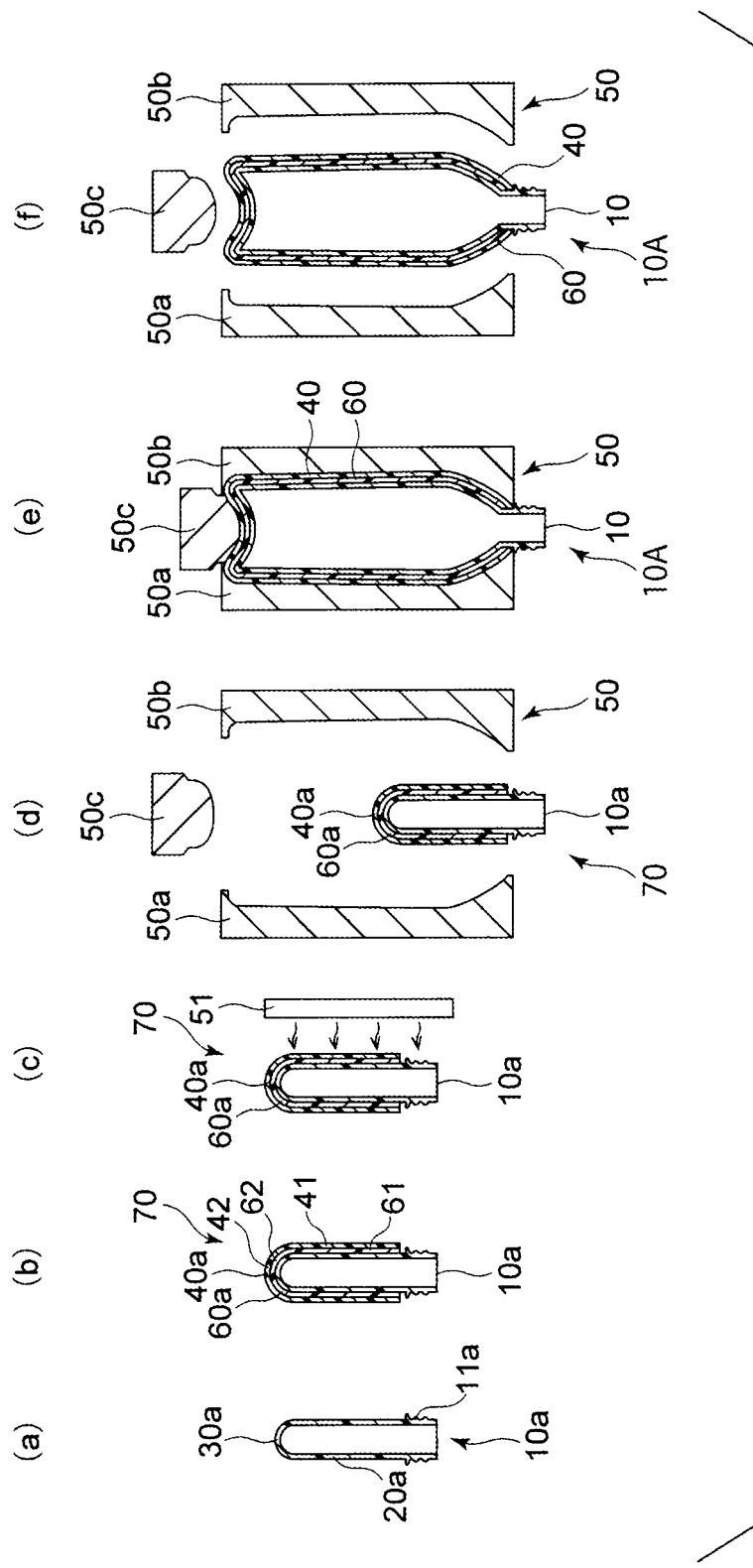
FIGS. 23(a) to 23(f) are schematic diagrams illustrating a method for producing a composite container according to one embodiment of the present invention.
Figure 24:
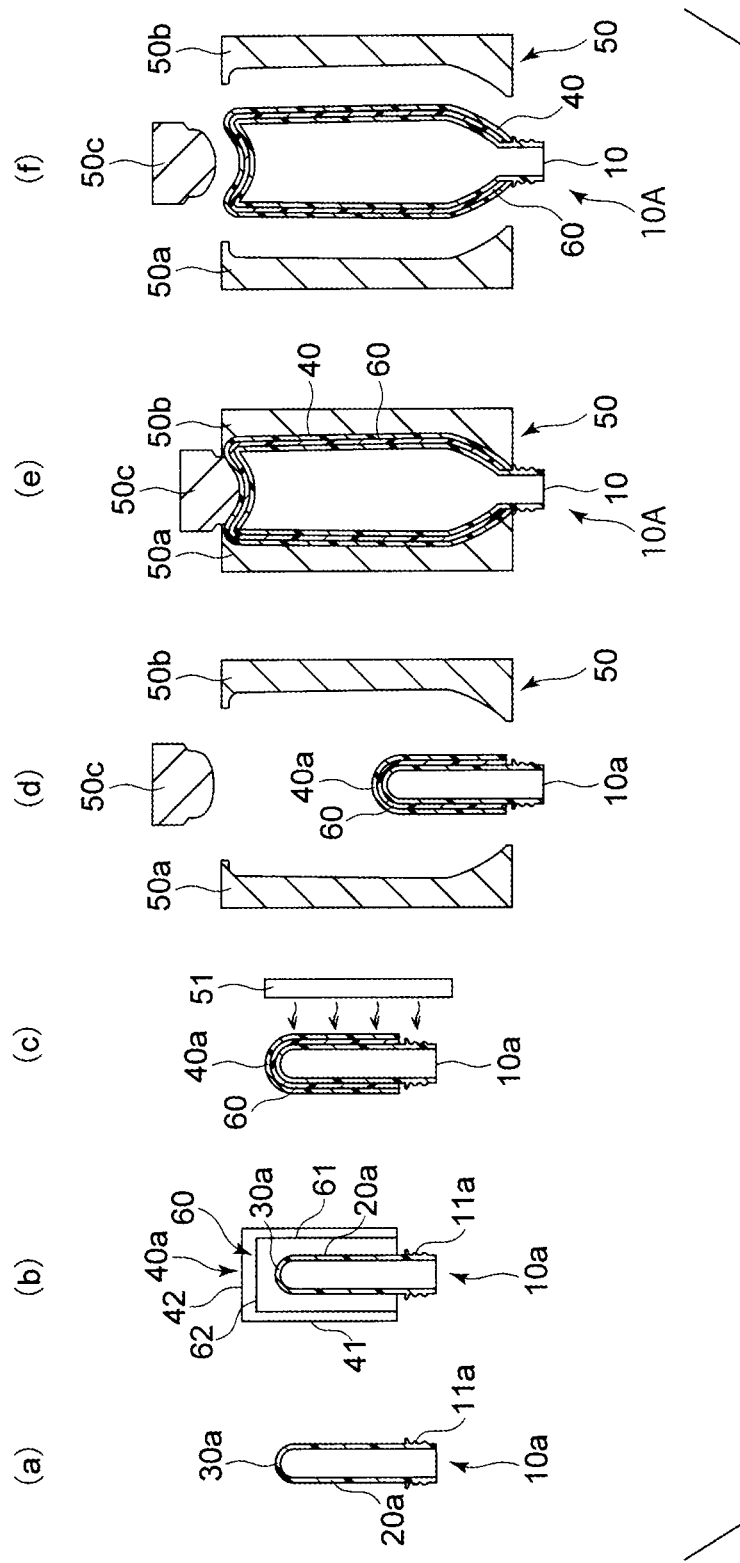
FIGS. 24(a) to 24(f) are schematic diagrams illustrating a method for producing a composite container according to one embodiment of the present invention.
Figure 25:
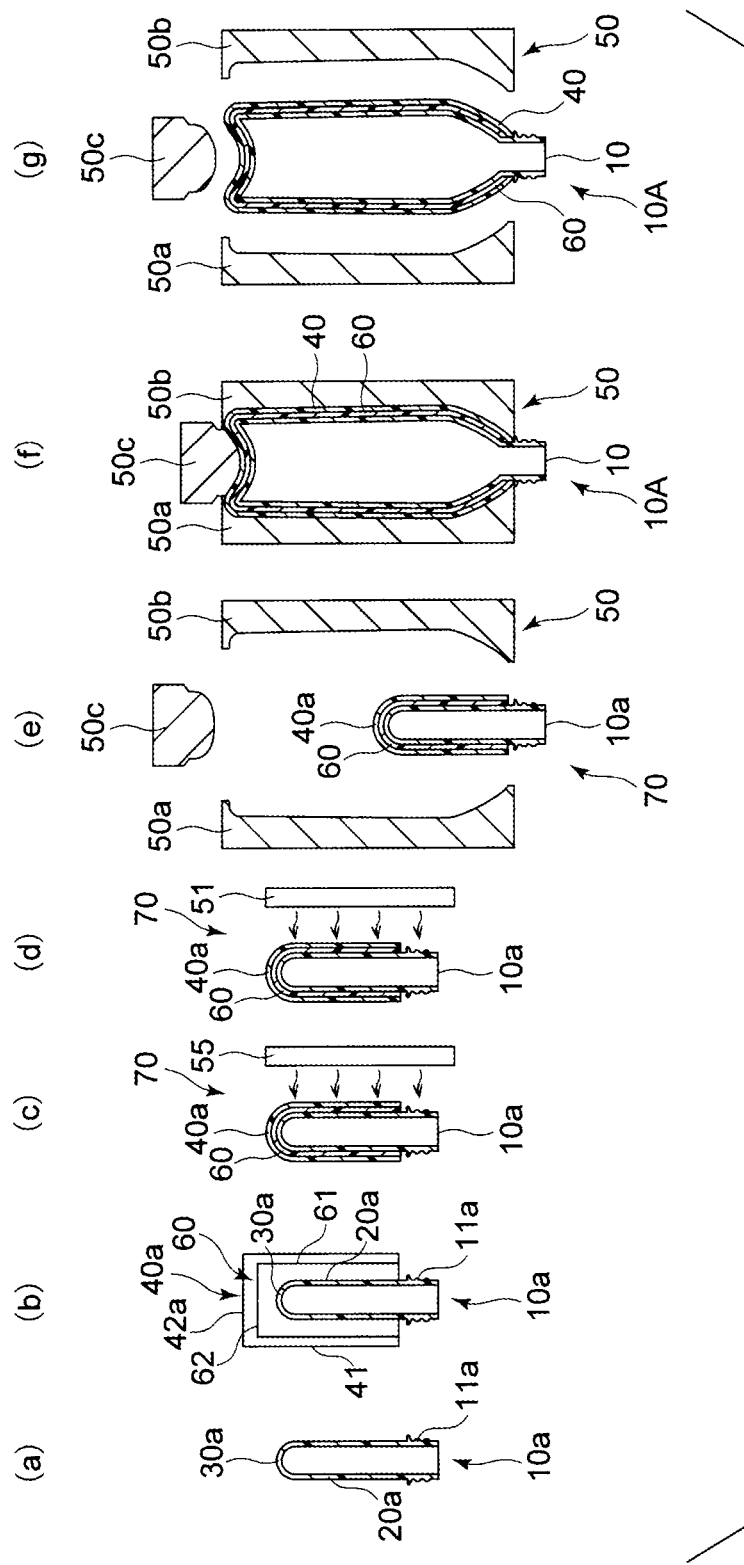
FIGS. 25(a) to 25(g) are schematic diagrams illustrating a method for producing a composite container according to one embodiment of the present invention.

As illustrated in FIG. 21, the composite preform 70 includes the preform 10*a*, which is made of a plastic material, the inner label member 60*a*, which is bottom-closed cylindrical and disposed in close contact with the outside of the preform 10*a*, and the plastic member 40*a*, which is composed of a plurality of layers disposed in close contact with the outside of the inner label member 60a and is bottom-closed cylindrical.

Inner Label Member 60a

The inner label member 60a is brought in close contact with the outer surface of the preform 10a so as not to easily move or turn with respect to the preform 10a. The inner label member 60a is disposed over the entire region of the preform 10a in its circumferential direction so as to surround the preform 10a, having a substantially circular horizontal cross section.

The inner label member 60a may be provided with a design or print in advance. For example, in addition to the artwork and product name, text information including the names of the liquid contents, manufacturer, and raw materials may be displayed. This enables images and/or letters to be displayed on the composite container 10A without the need for attaching a separate label to the container body 10 after blow molding. For example, the inner label member 60a may be disposed on the whole or part of the trunk part 20a of the preform 10a so that images and/or letters are displayed on the trunk part 20 of the container body 10 after the molding. This eliminates the need for the process of applying a label to the container by using a labeler after the container is sealed, thereby achieving reduction in manufacturing costs and prevention of lower production yields.

A film that can be used as such inner label member 60a may be, for example, a film made of a polyester-based resin, a polyamide-based resin, a polyaramide-based resin, a polypropylene-based resin, a polycarbonate-based resin, a polyacetal-based resin, or a fluorine-based resin. The inner label member 60a may be made of a material that is the same as, or different from, the material used for the preform 10a and/or the plastic member 40a.

For the inner label member 60a, various materials described below may also be used.

For example, the inner label member 60a may be composed of a material having gas barrier properties such as oxygen barrier properties or water vapor barrier properties. In this case, it is made possible to improve the gas barrier properties of the composite container 10A, thereby preventing the liquid contents from deteriorating due to oxygen and from decreasing in amount due to transpiration of water vapor, without the need for using a multi-layer preform or a preform containing a blended material as the preform 10a. Examples of such materials include PE, PP, MXD-6, and EVOH. It is also possible to mix any of these materials with an oxygen absorber such as a fatty acid salt.

The inner label member 60a may also be composed of a material having ray barrier properties against ultraviolet and other rays. In this case, it is made possible to enhance the ray barrier properties of the composite container 10A, thereby preventing the liquid contents from deteriorating due to ultraviolet and other rays, without the need for using a multi-layer preform or a preform containing a blended material as the preform 10a. Examples of such materials may include a blended material, or a material obtained by adding a light blocking resin to PET, PE, or PP.

The inner label member 60a may also be composed of a material having better heat or cold retaining properties (i.e., material of lower thermal conductivity) than the plastic material included in the container body 10 (preform 10a). In this case, it is made possible to reduce thermal conduction from the liquid contents to the surface of the composite container 10A, without the need for increasing the thickness of the container body 10 itself. As a result, the heat or cold retaining properties of the composite container 10A can be enhanced. Examples of such materials may include foamed polyurethane, polystyrene, PE, PP, phenolic resin, polyvinyl chloride, urea resin, silicone, polyimide, and melamine resin.

On the other hand, the plastic member 40a is not adhered but attached on the outer surface of the inner label member 60a, being closely attached so as not to move or turn with respect to the preform 10a. The plastic member 40a is disposed over the entire region of the preform 10a in its circumferential direction so as to surround the preform 10a, having a substantially circular horizontal cross section.

In this example, the inner label member 60a and the plastic member 40a are disposed so as to cover the whole trunk part 20a excluding the part 13a, which corresponds to the neck part 13 of the container body 10, and to cover the whole bottom part 30a.

The inner label member 60a and the plastic member 40a may be disposed on the whole or part of the region excluding the mouth part 11a. For example, the inner label member 60a and the plastic member 40a may be disposed so as to entirely cover the trunk part 20a and the bottom part 30a excluding the mouth part 11a. In addition, the number of inner label members 60a and plastic members 40a each may be two or more as well as one. For example, two inner label members 60a and two plastic members 40a may be respectively disposed on two different portions of the outside of the trunk part 20a.

Such plastic member 40a may not have, or may have, the function of contracting with respect to the preform 10a.

In the latter case, any material having the function of contracting with respect to the preform 10a may be used for the plastic member (contractive tube) 40a. It is preferable to use such plastic member (contractive tube) 40a as will contract (e.g., heat-shrink) with respect to the preform 10a when an external effect (e.g., heat) is added.

The configurations of the composite container 10A and the composite preform 70 in other respects are substantially similar to those in the above-described first embodiment, and thus detailed descriptions thereof are omitted.

The following describes shapes of the plastic member 40a and/or the inner label member 60a.

As illustrated in FIG. 22(a), the plastic member 40a (inner label member 60a) may be in a bottom-closed cylindrical shape as a whole, having a cylindrical trunk part 41 (trunk part 61) and a bottom part 42 (bottom part 62) linked to the trunk part 41 (trunk part 61). In this case, the plastic member 40a (inner label member 60a), with its bottom part 42 (bottom part 62) covering the bottom part 30a of the preform 10a, can give various functions and characteristics not only to the trunk part 20 of the composite container 10A but also to the bottom part 30.

As illustrated in FIG. 22(b), the plastic member 40a (inner label member 60a) may also be in a circular tube (bottom-open cylindrical) shape as a whole, having a cylindrical trunk part 41 (trunk part 61). In this case, an extruded tube, for example, can be used as the plastic member 40a (inner label member 60a).

As illustrated in FIGS. 22(c) and 22(d), the plastic member 40a (inner label member 60a) may be made by sticking together both ends of a film formed in a cylindrical shape. In this case, the plastic member 40a may be formed to be tubular (bottom-open cylindrical) having the trunk part 41 (trunk part 61) as illustrated in FIG. 22(c), or may be formed to be bottom-closed cylindrical by sticking together the bottom part 42 (bottom part 62) as illustrated in FIG. 22(d).

Method for Producing Composite Container 10A

A method for producing (blow molding) the composite container 10A according to the present embodiment will now be described with reference to FIGS. 23(a) to 23(f).

First, a preform 10a made of a plastic material is prepared (see FIG. 23(a)).

Next, the inner label member 60a is disposed on the outside of the preform 10a, and the plastic member 40a, which is composed of a plurality of layers and at least one of the layers is a colored layer, is disposed on the outside of the inner label member 60a. Consequently, the composite preform 70 including the preform 10a, the inner label member 60a in close contact with the outer surface of the preform 10a, and the plastic member 40a in close contact with the outside of the inner label member 60a is produced (see FIG. 23(b)). In this example, the inner label member 60a is in a bottom-closed cylindrical shape as a whole, having a cylindrical trunk part 61 and a bottom part 62 linked to the trunk part 61.

In this step, the inner label member 60a and the plastic member 40a, which have inner diameters equal to or slightly smaller than the outer diameter of the preform 10a, may be brought in close contact with the outer surface of the preform 10a by pressing the inner label member 60a and plastic member 40a respectively into the preform 10a. Alternatively, the inner label member 60a and the plastic member 40a that are heat-contractive may be disposed on the outer surface of the preform 10a, and then the inner label member 60a and the plastic member 40a may be heated to 50° C. to 100° C. to cause them to heat-shrink to be in close contact with the outer surface of the preform 10a.

The plastic member 40a may also be disposed around the inner label member 60a in advance, and then the inner label member 60a with the plastic member 40a may be integrally attached on the outside of the preform 10a. Alternatively, the inner label member 60a may be disposed on the outside of the preform 10a, and then the plastic member 40a may be disposed on the outside of the inner label member 60a.

In this way, the composite preform 70 is made in advance by bringing the plastic member 40a in close contact with the outside of the preform 10a and the inner label member 60a. Thus, it is made possible to carry out the series of processes for making the composite preform 70 (FIGS. 23(a) and 23(b)) in a place (e.g., factory) different from the place (e.g., factory) where the series of processes for making the composite container 10A by means of blow moldering (FIGS. 23(c) to 23(f)) is carried out.

Next, the composite preform 70 is heated by a heating apparatus 51 (see FIG. 23(c)).

Subsequently, the composite preform 70, which has been heated by the heating apparatus 51, is fed to a blow molding die 50. The blow molding die 50 is used to mold into the composite container 10A, which includes the container body 10, the inner label member 60 disposed on the outer surface of the container body 10, and the plastic member 40 disposed on the outside of the inner label member 60, in a way substantially similar to that in the above-described first embodiment (see FIGS. 23(d) to 23(f)).

The method for producing the composite container 10A (the blow molding method) in other respects according to the present embodiment is substantially similar to that in the above-described first embodiment, and thus detailed descriptions thereof are omitted.

Variation of Method for Producing Composite Container 10A

A variation of the method for producing the composite container 10A (the blow molding method) according to the present embodiment will now be described with reference to FIGS. 24(a) to 24(f). The variation illustrated in FIGS. 24(a) to 24(f) represents that the plastic member (contractive tube) 40a has the function of contracting with respect to the preform 10a. The configuration in other respects is substantially the same as that of the embodiment illustrated in FIGS. 23(a) to 23(f). Elements in FIGS. 24(a) to 24(f) identical to those in FIGS. 23(a) to 23(f) are given the identical reference signs and detailed descriptions thereof are omitted.

First, a preform 10a made of a plastic material is prepared (see FIG. 24(a)).

Next, the inner label member 60a is disposed on the outside of the preform 10a, and the plastic member (contractive tube) 40a is disposed on the outside of the inner label member 60 (see FIG. 24(b)). The inner label member 60 and the plastic member (contractive tube) 40a are attached so as to cover the whole trunk part 20a excluding the part corresponding to the neck part 13 of the container body 10 and to cover the whole bottom part 30a. At least part of the plastic member (contractive tube) 40a may be translucent or transparent.

In this case, the plastic member (contractive tube) 40a may be disposed around the inner label member 60a in advance, and then the inner label member 60a with the plastic member (contractive tube) 40a may be integrally attached on the outside of the preform 10a. Alternatively, the inner label member 60a may be disposed on the outside of the preform 10a, and then the plastic member (contractive tube) 40a may be disposed on the outside of the inner label member 60.

Subsequently, the preform 10a, the inner label member 60a, and the plastic member (contractive tube) 40a are heated by a heating apparatus 51 (see FIG. 24(c)). In this step, the preform 10a, the inner label member 60a, and the plastic member (contractive tube) 40a, while turning with the mouth part 11a facing downward, are heated by the heating apparatus uniformly in the circumferential direction. The heating temperature for the preform 10a, the inner label member 60a, and the plastic member (contractive tube) 40a in this heating process may be set to 90° C. to 130° C., for example.

In this way, the plastic member (contractive tube) 40a is heated to contract (heat-shrunk), resulting in closely contacting with the outside of the preform 10a (see FIG. 24(c)). In the case where the plastic member (contractive tube) 40a is contractive itself, the plastic member (contractive tube) 40a may be in close contact with the outside of the inner label member 60a immediately when disposed on the outside of the inner label member 60a (see FIG. 24(b)).

Subsequently, the preform 10a, the inner label member 60a, and the plastic member (contractive tube) 40a, which have been heated by the heating apparatus 51, are fed to a blow molding die 50 (see FIG. 24(d)).

The blow molding die 50 is used to mold the preform 10a, the inner label member 60a, and the plastic member (contractive tube) 40a, producing the composite container 10A, which includes the container body 10, the inner label member 60 disposed on the outside of the container body 10, and the plastic member (contractive tube) 40 disposed on the outside of the inner label member 60, in a way substantially similar to that illustrated in FIGS. 23(a) to 23(f) (see FIGS. 24(d) to 24(f)).

Another Variation of Method for Producing Composite Container 10A

Another variation of the method for producing the composite container 10A (the blow molding method) according to the present embodiment will now be described with reference to FIGS. 25(a) to 25(g). The variation illustrated in FIGS. 25(a) to 25(g) represents that the plastic member 40a has the function of contracting with respect to the preform 10a, and the preform 10a and the plastic member (contractive tube) 40a are heated in two steps. The configuration in other respects is substantially the same as that of the embodiment illustrated in FIGS. 23(a) to 23(f). Elements in FIGS. 25(a) to 25(g) identical to those in FIGS. 23(a) to 23(f) are given the identical reference signs and detailed descriptions thereof are omitted.

First, a preform 10a made of a plastic material is prepared (see FIG. 25(a)).

Next, the inner label member 60a is disposed on the outside of the preform 10a, and the plastic member (contractive tube) 40a is disposed on the outside of the inner label member 60 (see FIG. 25(b)). The plastic member (contractive tube) 40a is attached so as to cover the whole trunk part 20a excluding the part corresponding to the neck part 13 of the container body 10 and to cover the whole bottom part 30a. At least part of the plastic member (contractive tube) 40a may be translucent or transparent.

In this case, the plastic member (contractive tube) 40a may be disposed around the inner label member 60a in advance, and then the inner label member 60a with the plastic member (contractive tube) 40a may be integrally attached on the outside of the preform 10a. Alternatively, the inner label member 60a may be disposed on the outside of the preform 10a, and then the plastic member (contractive tube) 40a may be disposed on the outside of the inner label member 60.

Subsequently, the preform 10a, the inner label member 60a, and the plastic member (contractive tube) 40a are heated by a first heating apparatus 55 (see FIG. 25(c)). The heating temperature for the preform 10a, the inner label member 60a, and the plastic member (contractive tube) 40a in this step may be set to 50° C. to 100° C., for example.

The plastic member (contractive tube) 40a is heated to contract (heat-shrunk), resulting in closely contacting with the outside of the preform 10a. Consequently, the composite preform 70 including the preform 10a, the inner label member 60a in close contact with the outside of the preform 10a, and the plastic member (contractive tube) 40a in close contact with the outside of the inner label member 60a is obtained (see FIG. 25(c)).

In this way, the composite preform 70 is made in advance by using the first heating apparatus 55 to heat the plastic member 40a (contractive tube) bringing it in close contact with the outside of the preform 10a and the inner label member 60a. Thus, it is made possible to carry out the series of processes for making the composite preform 70 (FIGS. 25(a) to 25(c)) in a place (e.g., factory) different from the place (e.g., factory) where the series of processes for making the composite container 10A by means of blow moldering (FIGS. 25(d) to 25(g)) is carried out.

Subsequently, the composite preform 70 is heated by a second heating apparatus 51 (see FIG. 25(d)). In this step, the composite preform 70, while turning with the mouth part 11a facing downward, is heated by the second heating apparatus 51 uniformly in the circumferential direction. The heating temperature for the preform 10a, the inner label member 60a, and the plastic member (contractive tube) 40a in this heating process may be set to 90° C. to 130° C., for example.

Subsequently, the composite preform 70, which has been heated by the second heating apparatus 51, is fed to a blow molding die 50 (see FIG. 25(e)).

The blow molding die 50 is used to mold the composite preform 70, producing the composite container 10A, which includes the container body 10, the inner label member 60 disposed on the outside of the container body 10, and the plastic member (contractive tube) 40 disposed on the outside of the inner label member 60, in a way substantially similar to that illustrated in FIGS. 23(a) to 23(f) (see FIGS. 25(e) to 25(g)).

As described above, according to the present embodiment, the composite container 10A, which includes the container body 10, the inner label member 60, and the plastic member 40, is made by integrally inflating the preform 10a, the inner label member 60a, and the plastic member 40a of the composite preform 70 through the blow molding performed on the composite preform 70 in the blow molding die 50. Thus, the inner label member 60 can be disposed in the composite container 10A in advance, and thereafter the preform 10a is used to produce the composite container 10A. Accordingly, it is unnecessary to provide the process of applying a label to the container by using a labeler after the composite container 10A is loaded with the liquid contents and sealed. Therefore, manufacturing costs for producing finished products can be reduced.

In addition, lower production yields in the manufacture of finished products due to, for example, a defect in the labeler can be prevented.

According to the present embodiment, the preform 10a (container body 10) and the plastic member 40a (plastic member 40) can be formed of different members. Therefore, various functions and characteristics can be given to the composite container 10A in a flexible manner by selecting an appropriate type and shape of the plastic member 40.

Furthermore, the present embodiment eliminates the need for preparing a new molding apparatus for making the composite container 10A, because the composite container 10A can be made by using general blow molding equipment with no changes added.

Variation of Second Embodiment

A variation of the present invention will now be described with reference to FIGS. 26, 27, and 28(a) to 28(f).

According to the variation illustrated in FIGS. 26, 27, and 28(a) to 28(f), an inner label member 60a and a plastic member 40a both in a cylindrical shape are used instead of the inner label member 60a and the plastic member 40a both having the trunk part and the bottom part.

Figure 26:
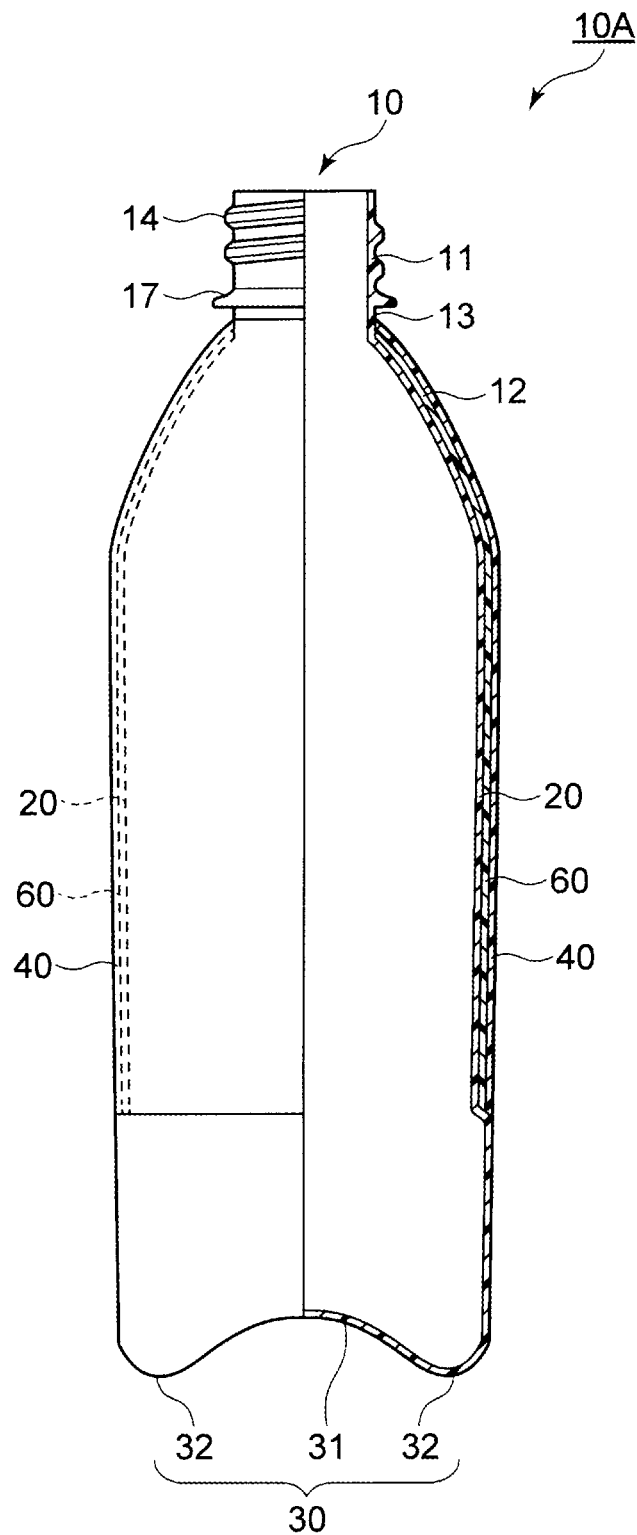
FIG. 26 is a partial vertical cross-sectional view illustrating a composite container according to one embodiment of the present invention.
Figure 27:
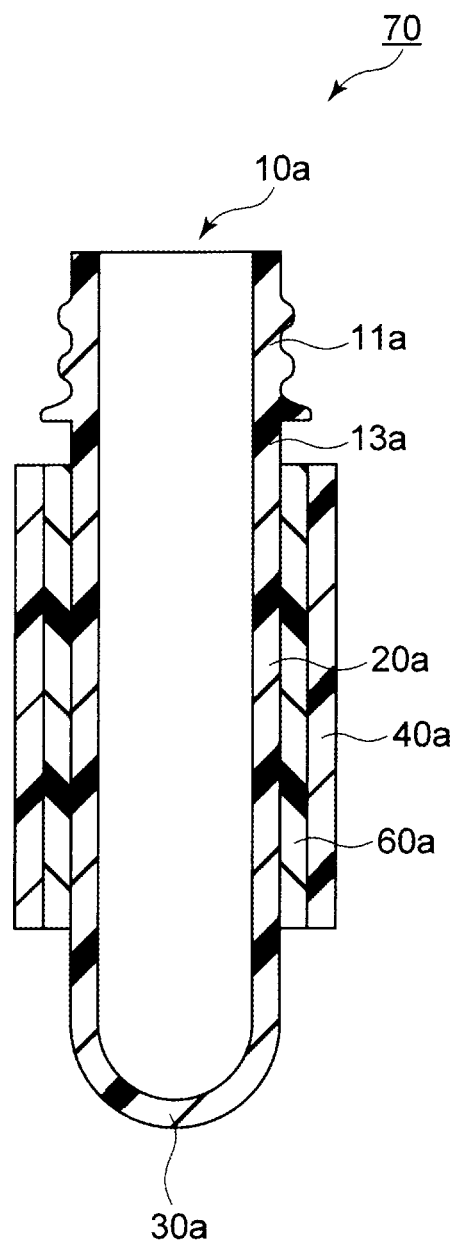
FIG. 27 is a vertical cross-sectional view illustrating a variation of a composite preform according to one embodiment of the present invention.
Figure 28:
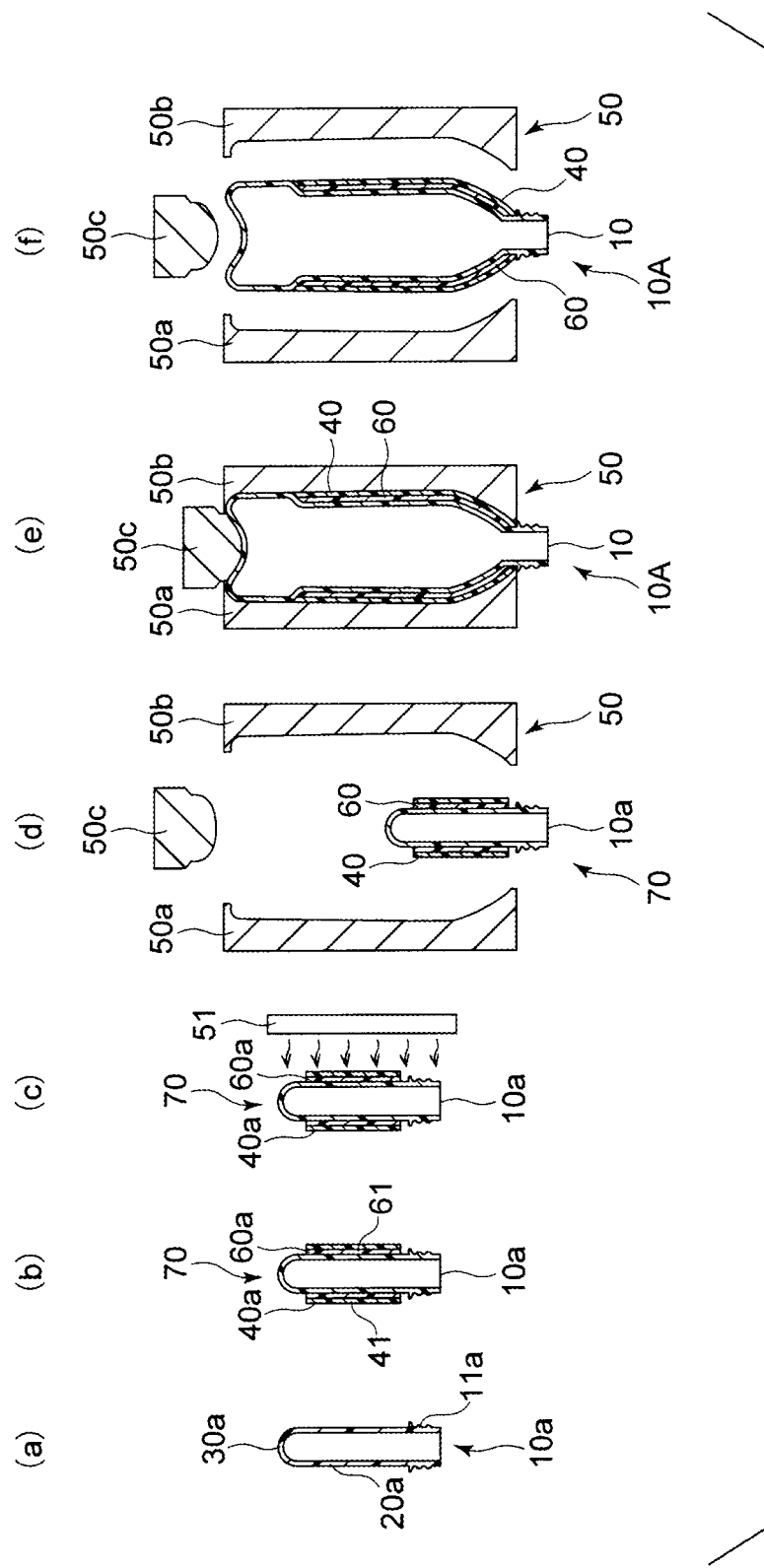
FIGS. 28(a) to 28(f) are schematic diagrams illustrating a method for producing a composite container according to one embodiment of the present invention.

In the composite container 10A illustrated in FIG. 26, the inner label member 60 and the plastic member 40 extend from the shoulder part 12 to a lower part of the trunk part 20 of the container body 10, but do not reach the bottom part 30. Further, in the composite preform 70 illustrated in FIG. 27, the inner label member 60a and the plastic member 40a are brought in close contact with the preform 10a to cover only the trunk part 20a of the preform 10a. More specifically, the inner label member 60a and the plastic member 40a cover the trunk part 20a excluding its lower part and the part 13a corresponding to the neck part 13 of the container body 10.

The configuration in other respects in FIGS. 26, 27, and 28(a) to 28(f) is substantially the same as that of the embodiment illustrated in FIGS. 19 to 25. Elements in the variation illustrated in FIGS. 26, 27, and 28(a) to 28(f) identical to those in the embodiment illustrated in FIGS. 19 to 25 are given the identical reference signs and detailed descriptions thereof are omitted.

The configuration and production method of the composite container 10A and the configuration and production method of the composite preform 70 are substantially similar to those of the embodiment illustrated in FIGS. 19 to 25, and thus detailed descriptions thereof are omitted. With reference to FIGS. 26, 27, and 28(a) to 28(f), the plastic member 40 having the function of contracting with respect to the preform 10a may be used.

The invention claimed is:

1. A composite container comprising:
 a container body made of a plastic material and having a shoulder part, a trunk part, and a bottom part, the bottom part including a central concave part and a grounding part surrounding the concave part; and
 a plastic member, comprising a heat contracting tube disposed on an outer surface of the container body,
 wherein the container body and the plastic member are integrally inflated by blow molding,
 wherein the plastic member comprises a colored layer and a print layer where a print is made,
 wherein the plastic member is not welded or adhered to the outer surface of the container body, whereby the plastic member can be peeled off from the container body,
 wherein the plastic member is a unitary body without a sticking part, and
 wherein the plastic member covers the shoulder part of the container body, the trunk part of the container body, and at least the grounding part of the bottom part of the container body.

2. The composite container of claim 1, wherein the plastic member also covers the concave part of the bottom part of the container body.

3. The composite container of claim 1, wherein the grounding part of the bottom part of the container body defines a lowermost surface of the bottom part of the container body that is adapted to contact a placement surface.

* * * * *